US005483113A

United States Patent [19]
Sakuragi et al.

[11] Patent Number: 5,483,113
[45] Date of Patent: Jan. 9, 1996

[54] ELECTRIC MOTOR FOR DRIVING A MAGNETIC DISK

[75] Inventors: Katsunori Sakuragi; Hideshi Fukutani; Akihide Matsuo, all of Yonago, Japan

[73] Assignee: Matsushita Electric Industrial Co., Ltd., Kadoma, Japan

[21] Appl. No.: 72,749

[22] Filed: Jun. 7, 1993

[30] Foreign Application Priority Data

Jun. 9, 1992 [JP] Japan .................................. 4-039277
Jun. 18, 1992 [JP] Japan .................................. 4-159202
Dec. 22, 1992 [JP] Japan .................................. 4-341895

[51] Int. Cl.⁶ ...................................................... H02K 7/00
[52] U.S. Cl. ........................... 310/67 R; 310/90; 310/156; 310/256; 360/99.08
[58] Field of Search ...................... 310/67 R, 90, 310/156, 51, 256, 254; 360/98.07, 99.04, 99.08

[56] References Cited

U.S. PATENT DOCUMENTS

| 4,724,346 | 2/1988 | Klein et al. | 310/67 R |
| 4,827,168 | 5/1989 | Nakajima . | |
| 4,928,029 | 5/1990 | Wright | 310/67 R |
| 4,987,329 | 1/1991 | Schmidt | 310/67 R |
| 4,996,613 | 2/1991 | Hishida | 360/99.08 |
| 5,138,209 | 8/1992 | Chuta et al. | 310/67 R |
| 5,256,922 | 10/1993 | Tanaka et al. | 310/67 R |

*Primary Examiner*—R. Skudy
*Attorney, Agent, or Firm*—Cushman, Darby & Cushman

[57] ABSTRACT

A cylindrical shielding plate is provided on an inner circumference of the cylindrical recess formed on the bracket of an electric motor of a magnetic disk drive, and an open sector of the stator core is arranged to coincide with the moving direction of read/write head. Or a cylindrical boss is inserted between the stationary shaft and the stator core. Thereby, high frequency electromagnetic noise to the magnetic disk is drastically reduced.

16 Claims, 18 Drawing Sheets

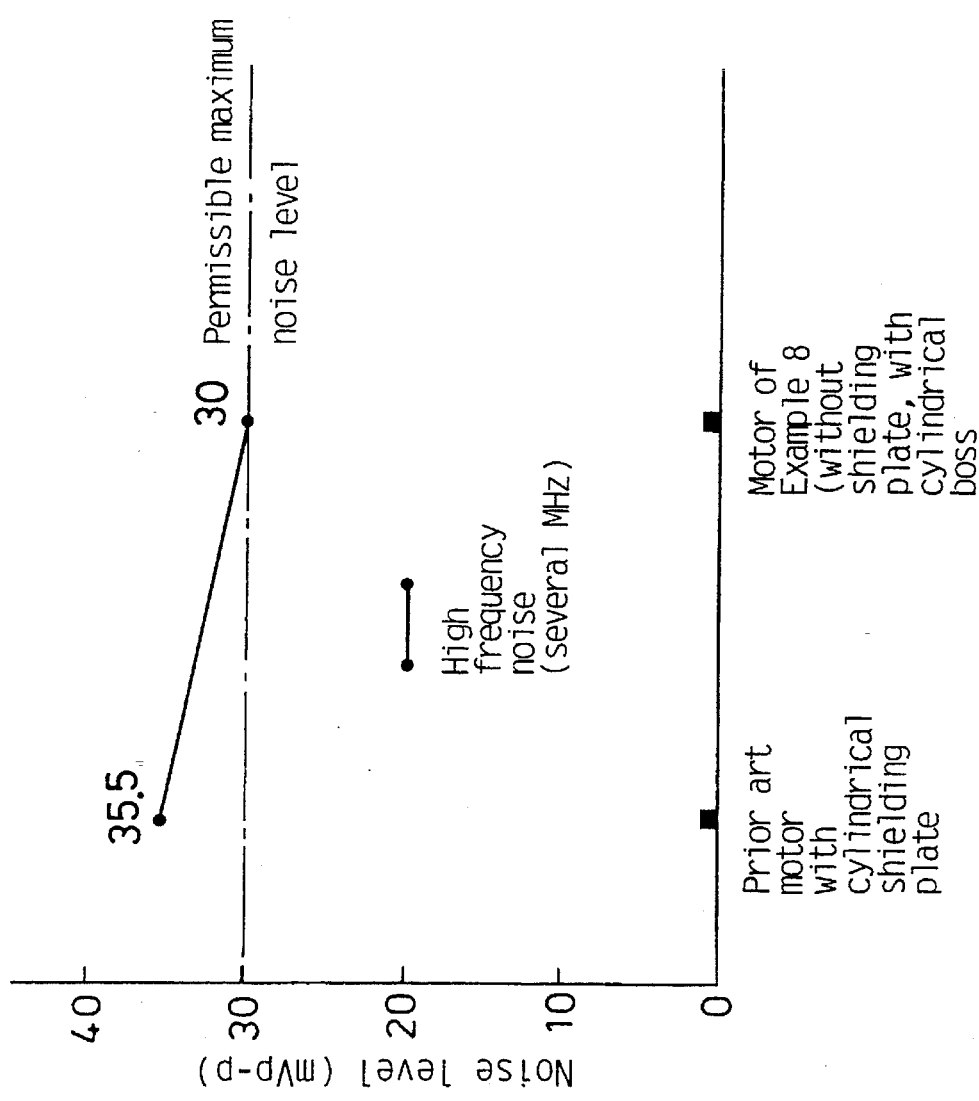

5,483,113

ELECTRIC MOTOR FOR DRIVING A MAGNETIC DISK

FIELD OF THE INVENTION AND RELATED ART STATEMENT

1. Field of the Invention

The present invention generally relates to a brushless motor for driving and rotating a magnetic disk in a magnetic disk driving unit. In particular, it is concerned with a structure of the brushless motor of the outer rotor-type (hereinafter, to be simply referred to as a "motor") that fixes a rotor magnet on an inner circumference of a cylindrical recess formed in a hub having a magnetic disk.

2. Description of Prior Art

In order to fulfill the recent demand for thinner size, miniaturization, larger capacity and smaller power consumption of a computer system, the height (axial dimension) of the magnetic disk driving unit has been increasingly reduced. A main trend of the magnetic disk driving unit is also changing from an 8 inch type to a 5.25 inch type, and further to a 3.5 inch type. Even a 2.5 inch type or even a 1.8 inch type appears likely.

Along with the recent popularization of a data base and that of an engineering work station, needs for an outside memory device having a larger capacity are increasing. A higher recording density of a disk drive unit is thus required, and accordingly narrower,track pitch in the magnetic disk is required.

Furthermore, with popularization of the portable (lap top) type personal computers, a small power consumption is particularly required and the demand for driving the motor in PWM is increasing. PWM is an abbreviation for Pulse Width Modulation, whereby a voltage to be applied to the motor is digitally controlled in ON/OFF fashion at high frequency pulses of controlled pulse widths using transistors.

The digital control of the motor can reduce its power consumption, because no current flows to the motor during OFF periods and thus the motor rotates by inertia during that period.

In addition to these, number of the magnetic disks accommodated in one disk drive unit is also in a trend of increase along with a demand for a larger capacity of the magnetic disk drive unit. For that reason, there arises another requirement for a motor to provide a high rigidity. The rigidity is represented as a displacement induced when a certain load is imposed on the motor. That is, it is indicated as [rigidity]=[load/displacement]. In other words, the high rigidity is expressed as a high permissible load per unit. By configuring the magnetic disk driving unit to have a high rigidity, the vibration of the magnetic disk can efficiently be reduced and thus the high density write-in/read-out operation of the data can be stabilized.

Furthermore, when dust is adhered to the very narrow clearance (0.1 micron) formed between the magnetic disk and the read/write head of the magnetic disk driving unit, or when the read/write head collides with the magnetic disk, the write-in/read-out operation of the data may sometimes be impaired. In order to avoid this difficulty, the region of the magnetic disk should be maintained clean by hermetical sealing. Such sealed region comprises the motor, the read/write head, the magnetic disk and the like, and the region is protected from any dust which may be introduced from the outside.

Incidentally, along with the recent trend of down-sizing of the computer using the magnetic disk drive, the demand for smaller size, smaller thickness, smaller noise, smaller power consumption and larger capacity has been growing. Although the clearance formed between the magnetic disk and the read/write head operating in the clean magnetic disk region is recently 0.1 micron, the clearance will further be reduced in the near future in order to realize a higher density of the write-in/read-out operation of the magnetic disk drive unit.

Among the components hermetically sealed in the magnetic disk region of the unit, the motor for driving the magnetic disk normally comprises at least one of the grease-sealed-in type bearings. It is virtually impossible for such motor to perform an oiling or greasing of the bearings (actually, antifriction bearings are widely used) in its magnetic disk equipped-state. Although the magnetic disk region is configured to prevent the intrusion of any dust from the outside as described above, the oily component such as grease may however be splashed from the grease-sealed-in type bearings and adhere on the magnetic disk in some cases. Thus, such magnetic disk drive unit has such a disadvantage that the oily or greasy small particles adhered on the magnetic disk may sometimes impair the function of the magnetic disk drive unit, and may result in a cause for the failure of the overall system.

[Prior Art Configuration]

In the following paragraphs, the prior art motor will be described with reference to the attached drawings, in which FIG.15 is a cross-sectional side view of an example of the prior art motor.

In FIG.15, a spacer 12 is arranged between an upper bearing 7 and a lower bearing 8 having inner bearing seats (sleeves), to which a stationary shaft 1 is fit-in and secured thereto. A hub 2 for carrying and driving a plurality of magnetic disks 36 is rotatably supported on outer bearing seats of the bearings 7 and 8. A plurality of disk spacers 38 are alternately stacked between the adjacent magnetic disks 36, and the stacked body is secured on the hub 2 by a clamper 37 and clamper screws 39. On both sides of the respective magnetic disks 36, the read/write heads 35, which are for writing-in/reading-out data on each surface of each of the respective magnetic disks, are closely arranged with a certain clearance. The read/write heads 35 function of to move over the surface of the magnetic disk 36 for accessing the magnetically stored data.

A bracket 3 is secured on a chassis 28 of a magnetic disk drive unit 45 with a fastening screw 30. The stationary shaft 1 is provided on the bracket 3 at its center and extends axially upward to its magnetic disk carrying region 29. The hub 2 has a cylindrical recess on its lower part, and a cylindrical rotor magnet 4 is fixed on the inner circumference of the cylindrical recess. The cylindrical rotor magnet 4 is polarized to have a known multiple polarized pole.

A stator core 5 is fixed also on the stationary shaft 1 at its lower part and is confronting to the rotor magnet 4 with a certain gap therebetween. A plurality of coils 6 are wound around the stator core 5. A stator base plate 9 is provided on the bracket 3. On the stator base plate 9, there is provided a position detecting device 15, which controls the excitation of the coils 6 in a manner that it can detect the magnetic flux of the rotor magnet 4, for controlling rotation of the motor.

A fluid sealing structure is provided for preventing the splash of grease aerosol from the upper bearing 7 and the lower bearing 8. The fluid sealing structure is configured by magnetically retaining a small quantity of magnetic fluid 16 injected into a clearance formed between the stationary shaft 1 and an upper magnetic fluid seal 11. The magnetic fluid is made and sold by Ferrofluidies Corp. U.S.A., and is a solution wherein very fine $Fe_3O_4$ powder of average particle diameter of about 100 Å is dissolved in an ester as base oil or solvent.

A magnetic fluid seal holder 14 is provided on the inner circumference of the hub 2 for retaining and positioning the upper magnetic fluid seal 11. Another sealing structure is provided by a lower magnetic fluid seal 18, a magnetic fluid seal holder 13 provided at a mid part of the stationary shaft 1, for positioning the lower magnetic fluid seal 18 to retain a small quantity of magnetic fluid 17 which is injected into a clearance formed between the magnetic fluid seal 18 and the inner circumference of the hub 2.

A preloading spring 10 is positioned in a clearance formed between the lower bearing 8 and the lower magnetic fluid seal holder 13. The preloading spring 10 is effective for maintaining the rigidity of the rotating body by imposing an appropriate axial preload on both the upper bearing 7 and the lower bearing 8, thus for preventing the generation of the vibration during the rotation.

[Noise Problem of the Prior Art Motor]

In the following few paragraphs, the PWM noise generated from the thus configured motor will be briefly described. The PWM noise generates from the coil 6 on which an ON-OFF voltage in a high frequency is applied, and propagates through the stationary shaft 1, the bracket 3 and the hub 2. Then the noise is radiated to the surrounding space. The radiated noise sometimes enters into the read/write head 35. The PWM noise may further propagate from the hub 2 to the surfaces of the magnetic disks 36 and then to the read/write head 35. Thus the PWM noise gives a detrimental influence, such as, the reduction in the output of the read/write head 35, the deterioration in the S/N ratio and the generation of the pulsative noise. These are the main causes of the malfunction of the writing-in/reading-out operation of the data and for the deterioration in the overall function of the magnetic disk drive unit.

FIGS. 7A and 7B are a graph comparisons of the prior art with the present invention wherein showing levels of the high frequency noise at several MHz, which are the harmonic components of the PWM noises of the prior art motor (having no cylindrical shielding plate 19) and the motor with cylindrical shielding plate, built in accordance with the present invention which will be described later. From the result of the comparison, it is appreciated that the prior art motor (having no cylindrical shielding plate 19) has the high frequency noise of 46 mV p-p, which is above the permissible value of 30 mV p-p.

FIG. 16, is a side cross-sectional view of another example of the prior art motor. In FIG. 16, a circular bracket 3c made of aluminum has a center opening in which a stationary shaft 1e made of stainless steel is fitted and secured thereto. A stator base plate 9c is also fixed on the bracket 3c by adhesion. On the stationary shaft 1e, there is provided a stator core 5c coated with an insulation layer 46 and wound with coils 6c. The stator core 5c is fixed on the lower part of the stationary shaft 1e, after the provision of the coils 6c, and then both ends of the coils 6c are soldered on soldering lands (not shown) on the stator base plate 9c. At a portion of the stationary shaft 1e located above the stator core 5c, there is provided a fastening collar 47 for positioning a pair of preloading springs 10b.

A rotor 48 is configured by inserting a rotor magnet 4c into an inner circumferential surface of a first cylindrical recess 50 of a cylindrical hub 2e made of iron or iron-alloy metal having an outer circumference 49 suitable for mounting a plurality of magnetic disks. In a second cylindrical recess 51 of the hub 2e, there are provided the upper bearing 7 and the lower bearing 8 spaced apart by a spacer 12b, along the axial direction of the stationary shaft 1e. A partial assembling of the rotor 48 is thus completed.

Then, after the pair of preloading springs 10b are inserted above the fastening collar 47 secured on the stationary shaft 1e, the rotor 48 is mounted around the stationary shaft 1e with some axial preload. Then the stationary shaft 1e is fitted in the inner bearing seats of the lower bearing 8 and the upper bearing 7. Thus the rotor 48 having the rotor magnets 4c is rotatably supported on the stationary shaft 1e which is secured on the center of the bracket 3c.

An upper magnetic fluid seal 11b is positioned above the upper bearing 7 through a ring member 52, and a small quantity of magnetic fluid 16 is injected into a clearance formed between the upper fluid seal 11b and the stationary shaft 1e. By the provision of the magnetic fluid 16, a boundary between the upper bearing 7 and the magnetic disk region 53 is sealed for preventing the grease aerosol generated in the upper bearing 7 from splashing and transferring to the clean magnetic disk region 53. Thereby preventing the contamination of the magnetic disk region 53 is prevented.

A magnetic fluid protecting disc 20 is also provided at the top part of the ring member 52 and above the region containing the magnetic fluid 16. Even when the magnetic fluid 16 should be splashed by the centrifugal force during the rotation of the motor, the protecting disc 20 can prevent the magnetic fluid 16 from being transferred to the vicinity of the magnetic disks.

Furthermore, a labyrinth seal is formed consisting of a pair of annular cylindrical protrusions 64 provided on a bottom face of a flange 63, which has a diameter D (shown in FIG. 17), of the hub 2e and an annular cylindrical protrusion 61, which is projected from the bottom of the annular groove 3'c formed on the bracket 3c. These protrusions 64 and groove 3'c mate with one another through small clearances 60 of L1 (FIG. 17).

This labyrinth seal separates the space 65 wherein the bearings 7 and 8 are accommodated from the magnetic disk region 53 and shuts off the flow of the air therebetween. Further, it prevents the grease aerosol generated in the under bearing 8 from splashing and transferring to the clean magnetic disk region 53. Thus the contamination of the magnetic disk region 53 is prevented.

The thus configured prior art structure however has a problem in that the PWM noise generated in the coil radiates to the surrounding space, enters into the read/write head, gives a detrimental effect on the output of the read/write head and results in malfunction in the write-in and read-out operation of the data.

Furthermore the above-mentioned prior art structure has had a mechanical problem attributable to a deficiency of rigidity, which may also result in the malfunction in the write-in and read-out of the data. Although it is a usual practice to increase the axial preload imposed on the bearings for increasing the rigidity, such measure has a problem of increasing the noise generated from the bearings.

In general, it is the recent trend that the rotational frequency of the motor becomes higher for shorter access time. For example from the currently employed rotational frequency, in general, of 3600 RPM, there has been a growing demand to increase to a higher rotational frequency, e.g., 4400 RPM or 5400 RPM. In the above-mentioned prior art configuration, the grease in The bearing is in a growing trend of becoming liable to be splashed more, with the higher rotational frequency of the motor.

In order to shut off the flow of the air between the space accommodating the bearings and the magnetic disk region, it is desirable to reduce a cross-sectional area occupied by the clearances 60 of L1 shown specifically by FIG. 17. Although it is possible to decrease the cross-sectional area occupied by the clearance 60, by making the value of L1 small, such decrease of clearance accompanies an economical problem, because a higher precision is required in the machining of the annular cylindrical protrusions 61 and 64. Further, even if the clearance 60 of the value L1 can be narrowed by the precision machining, there would arise another problem in that a mechanical touching may sometimes happen between the protrusions 61 and 64 during the operation of the motor, as a result of difference in the thermal expansions of these components.

OBJECT AND SUMMARY OF THE INVENTION

It is therefore the primary object of the present invention to solve the above-mentioned problems inherent to the prior art configuration, and to provide a motor that successfully reduces the electromagnetic noise or the PWM noise.

It is another object of the present invention to provide a motor having a improved rigidity for a stabilized read/write operation at a higher recording density.

It is a further object of the present invention to provide a motor that can reduce the dispersion of the grease aerosol or other oily component from the bearings during its rotation at a high rotational frequency.

According to the present invention, there is provided an electric motor for driving a magnetic disk, comprising:

a bracket secured to and fixed on a magnetic disk driving unit;

a stationary shaft fixed on the bracket and extending axially to a region where the magnetic disks are accommodated;

a hub for carrying and rotating at least one magnetic disk;

at least one bearing supported by the stationary shaft, for rotatably holding the hub;

a rotor magnet provided on an inner circumference of the hub, for generating a rotational force on the hub;

a stator core with a plurality of coils provided on the stationary shaft at a position which confronts to the rotor magnet; and a cylindrical shielding plate provided on an inner circumference of a cylindrical recess formed on the bracket.

In the above-described motor, the cylindrical shielding plate provided on the inner circumference of the cylindrical recess formed on the bracket is preferably of a material having a high electric conductivity or high permeability. The material may be the same as that of the bracket and the cylindrical shielding plate may be formed integrally with the bracket. The material may be aluminum or an aluminum alloy or permalloy.

Alternatively, the cylindrical shielding plate is preferably of a material having a high magnetic permeability, and has an open sector along its circumference. In this case, a direction, along which a read/write head moves to access the magnetic disk, may be arranged to coincide with the radial centerline of a closed sector in the cylindrical shielding plate.

The direction along which the read/write head moves to access the magnetic disk may be arranged to coincide with one of the open sectors between the adjacent pole pieces of the stator core.

According to another aspect of the present invention, there is provided an electric motor for driving a magnetic disk, comprising:

a bracket secured to and fixed on a magnetic disk driving unit;

a stationary shaft fixed on the bracket and extending axially to a region where the magnetic disks are accommodated;

a hub for carrying and rotating the magnetic disk;

at least one bearing supported by the stationary shaft, for rotatably holding the hub;

a rotor magnet provided on an inner circumference of the hub, for generating a rotational force on the hub;

a stator core with a plurality of coils provided on the stationary shaft at a position that confronts to the rotor magnet; and a cylindrical boss inserted between the stationary shaft and the stator core.

In addition to these, there is provided an electric motor for driving a magnetic disk, comprising:

a stationary shaft directly mounted on a chassis of a magnetic disk drive unit and extending axially to a region where the magnetic disks are accommodated;

a hub for carrying and rotating the magnetic disks;

at least one bearing supported by the stationary shaft, for rotatably holding the hub;

a rotor magnet provided on an inner circumference of the hub for generating a rotational force for the hub;

a stator core with a plurality of coils provided on the stationary shaft at a position that confronts to the rotor magnet; and a cylindrical boss inserted between the stationary shaft and the stator core.

In the above-mentioned motor, the cylindrical boss provided between the stationary shaft and the stator core is preferably made of a material having a high electric conductivity or high permeability.

In the above-mentioned motor, the cylindrical boss provided between the stationary shaft and the stator core is preferably made of aluminum or an aluminum alloy.

The above-mentioned motor may further comprise; a preloading spring for imposing an axial preload on the bearing and a stepped collar having a flat flange for retaining the preloading spring; wherein the cylindrical boss is preferably made of a material which is the same as that of the stepped collar and formed integrally with the stepped collar secured to the stationary shaft.

In the above-mentioned motor, the cylindrical boss is preferably made of a material which is the same as that of the bracket and formed integrally with the bracket. The material may be aluminum or an aluminum alloy.

In the above-mentioned motor, the lower end of the stepped collar is preferably arranged to contact the bracket, in order to accurately determine the height of the stepped collar.

In a case where the stationary shaft is directly secured to the chassis of the magnetic disk driving unit, the cylindrical boss is preferably made of a material which is the same as that of the chassis of the magnetic disk driving unit and formed integrally with the chassis.

According to a further aspect of the present invention, there is provided a motor for driving a magnetic disk, comprising:

a bracket secured to and fixed on a magnetic disk driving unit;

a stationary shaft fixed on the bracket and extending axially to a region where the magnetic disks are accommodated;

a hub for carrying and rotating the magnetic disk;

at least one bearing supported by the stationary shaft, for rotatably holding the hub;

a rotor magnet provided on an inner circumference of a cylindrical recess formed in the hub, for generating a rotational force on the hub;

a stator core with a plurality of coils provided on the stationary shaft at a position which confronts to the rotor magnet;

at least one magnetic fluid seal arranged in a manner that it prevents the dispersion of grease from the bearing; and, at least one magnetic fluid seal holder made of a resin and secured to the stationary shaft or the hub, for retaining the magnetic fluid seal.

According to a still further aspect of the present invention, there is provided an electric motor for driving a magnetic disk comprising:

a bracket secured to and fixed on a magnetic disk driving unit;

a stationary shaft fixed on the bracket and extending axially to a region where the magnetic disks are accommodated;

a hub having an outer circumference for mounting at least one magnetic disk in its magnetic disk region and a stepped cylindrical recess which has a first, a second and a third inner circumference region;

a rotor magnet fitted in the first inner circumference region;

a stator core secured on the stationary shaft at a position that confronts to the rotor magnet;

a set of excitation coils wound on the stator core;

a pair of bearings, whose outer bearing sleeves are fitted in the second inner circumference region and whose inner bearing sleeves are secured to the stationary shaft;

a magnetic fluid seal arranged above the upper bearing of the pair of bearings;

a stepped collar having a center navel which extends axially downward for being secured to the stationary shaft, a flat flange for positioning at least one coned disc spring for imposing an axial preload on the pair of bearings, and a crown edge which extends axially upward and forms an annular cylinder that enters into an annular cylindrical space formed between the outer circumference of the lower bearing and the third inner circumferential region.

As above-mentioned, the motor for driving a magnetic disk built in accordance with the present invention has an advantage in that it can realize an excellent motor which solves the above-mentioned problems of the write-in/read-out malfunction in the magnetic disk driving unit. The advantage has been brought by configuring it to provide the cylindrical shielding plate, which may have the open sector, on the inner circumference of the cylindrical recess formed on the bracket. The radial centerline of one of the open sectors is arranged between the adjacent pole pieces of the stator core to coincide with the direction, along which the read/write head moves to access the data stored on the surface of the magnetic disk. By the above-mentioned configuration, the electromagnetic noise and the PWM noise generated by the motor and entering into the read/write head can be reduced, and the magnetic flux leaked from the rotor magnet can also be shut off.

When the cylindrical boss made of a material having a high electric conductivity is inserted between the stationary shaft made of stainless steel and the stator core, the high frequency noises of several MHz are hardly transferred from the stator core to the stationary shaft. Therefore the noises propagating from the stationary shaft to the bracket and to the hub are reduced. The high frequency noise are the harmonic components of the PWM noise and intrude into the read/write head output. Hitherto, such noise was not eliminated by known electrical filtering of the output in the signal processing circuit. In this configuration, the cylindrical boss may be formed integrally with the stepped collar, the bracket or the chassis of the magnetic disk drive unit.

Further, since the noise radiated into the surrounding space can also be reduced, the detrimental influence of the radiated noise on the read/write head can be reduced, accordingly. As a result, the problem of the malfunction in the write-in/read-out operation of the data attributable to this noise can also be improved.

The output signal from the read/write head is usually subjected to an electrical filtering system in a signal processing circuit. Since the constants in the electrical filtering system are selected and determined in a manner that the filtering system can eliminate the PWM noise, the primary component (20 and several KHz) can of course be removed, but the high frequency noises of several MHz which are the harmonic components of the PWM noise cannot be removed satisfactorily by mere passing of the output signal through the electrical filter.

The PWM noise due to the PWM driving is directly shut out, by the above-mentioned configuration and by so arranging one of the open sectors between the adjacent pole pieces of the stator core (which is the particular part where both the electromagnetic noise and the PWM noise are small), in the moving direction of the read/write head. Thereby it is now made possible to reduce the noise which adversely influences the read/write head. Further, the magnetic flux which leaks from the rotor magnets can also be shielded off by this configuration.

In addition to this, the high frequency noise of several MHz, which are the harmonic components of the PWM noise, can be made hardly liable to propagate from the stator core to the stationary shaft by employing this configuration. The noises, which are propagating from the stationary shaft to the bracket and to the hub, can be reduced, and the noise which is radiating into the surrounding space can also be reduced, thereby reducing the noise influencing the read/write head.

Further, when the cylindrical boss is formed integrally with the stepped collar or the bracket, the height of the stepped collar can be adjusted at a high accuracy, thus the deviation in the axial preload imposed on the bearings can be minimized, and the assembling operations of the motor and the unit are made easy.

In addition to this, when the magnetic fluid seal holder made of a resin is employed, the weight of the rotor is reduced, and thus its rigidity increases. The reason for this is that there is a method of showing the resonance frequency for indicating the rigidity, and that the higher the resonance frequency is, the higher the rigidity becomes. It is shown that:

[the resonance frequency]=[½π* (spring constant * acceleration of the gravity/weight of the rotor)$^{1/2}$], and thus the resonance frequency increases with the decrease in the weight of the rotor. Recently there are developed a number of resins having a linear coefficient of expansion that is substantially equal to that of a metal, a high reliability in its performance and easiness in its molding with low manufacturing cost.

When the motor is configured by providing a stepped collar having a center navel, a flat flange and a crown edge, a labyrinth seal is formed with the related components. The center navel extends axially downward for being secured by the stationary shaft, and the flat flange is serving for positioning a preloading spring for imposing an axial preload on said bearing. The crown edge extends axially upward for forming an annular cylinder that enters into an annular cylindrical space formed between the outer circumference of the lower bearing and said third inner circumferential region of the hub with a minute clearance. This labyrinth seal can shut out the flow of the air and prevent the grease aerosol generated in the upper and lower bearings from splashing, and thus can keep the magnetic disk region clean. Thereby, the functional trouble and the malfunction of the magnetic disk drive unit that have hitherto been induced by the adhesion of the splashed grease aerosol to the clearance can be reduced.

In this configuration, the cross-sectional area occupied by the clearance of the labyrinth can be made small, if the outer diameter of the crown edge is smaller than the corresponding inner diameter of the cylindrical recess of the hub, while the same clearance is maintained. If the cross-sectional area of the clearance is the same, it is unnecessary to increase the precision of the machining on the crown edge, and thus it is possible to provide a inexpensive motor. Further, since the clearance can be made larger as compared with the prior art motor, it is also possible to prevent a mechanical contact of the labyrinth structure to happen and to manufacture a motor having a stabilized quality.

While the novel features of the present invention are set fourth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 7A and 7B are graphs showing a comparison of PWM noise of the motor build in accordance with the present invention with the prior art motor.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

In the following paragraphs, the present invention will be described in detail by way of example with reference to the attached drawings. In the description, the parts and components which are the same as those in the prior art will be referred to by the same or similar reference symbols, and the explanations therefor will be omitted because these can also be applicable to the embodiments in a similar manner.

EXAMPLE 1

Figure 1:
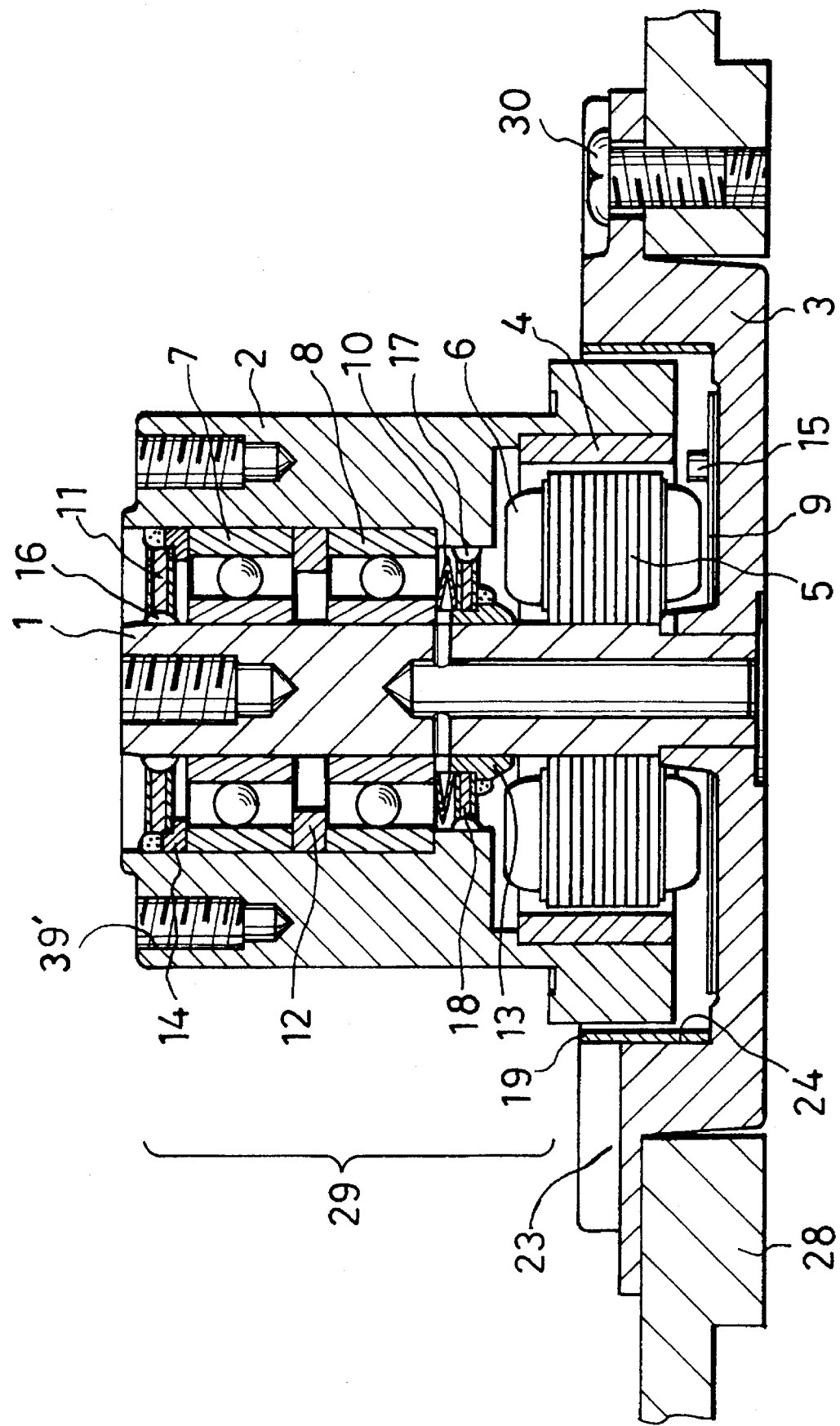
FIG. 1 is a cross-sectional side view of the motor built in accordance with a first embodiment of the present invention.
Figure 2:
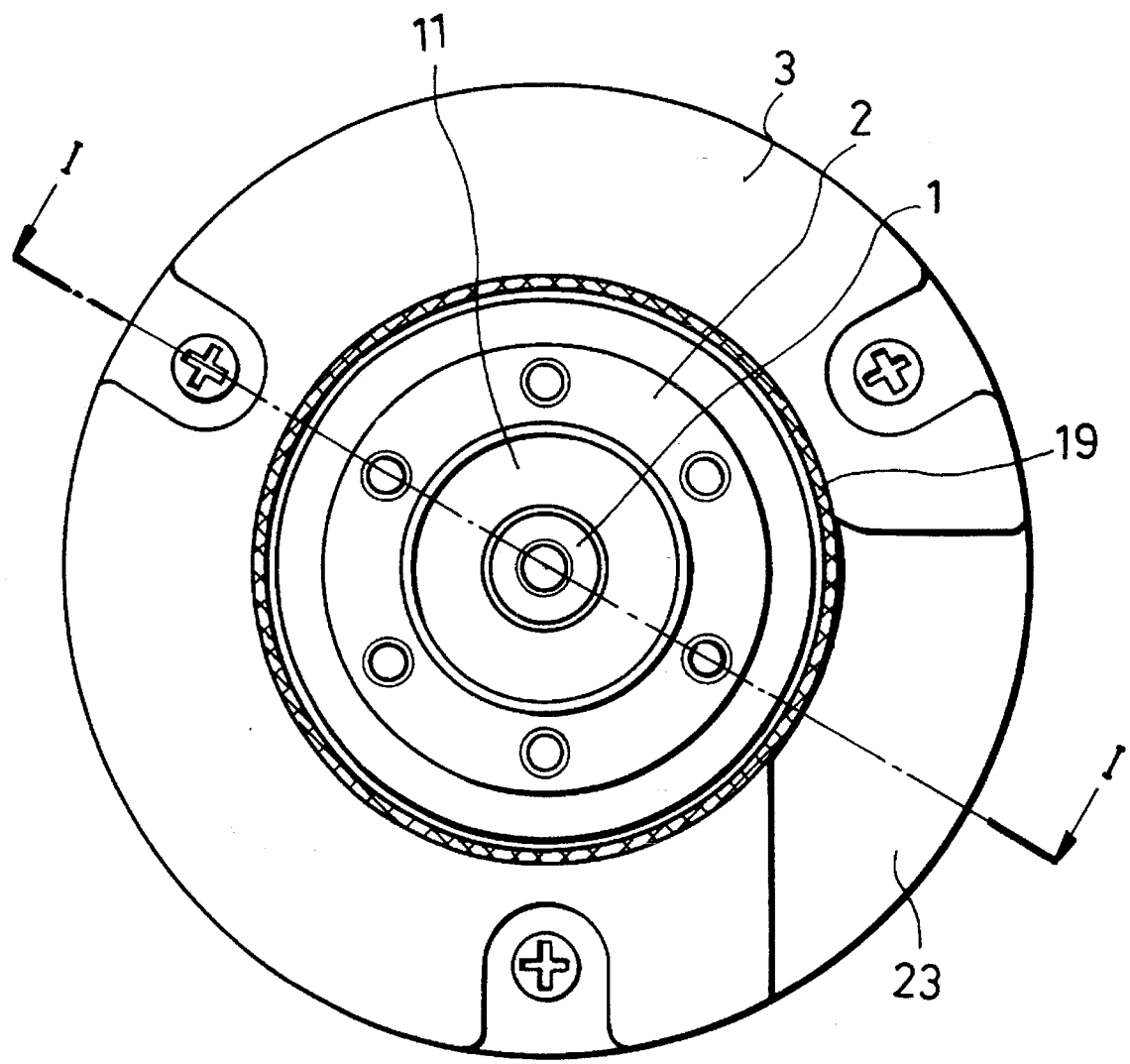
FIG. 2 is a plan view of the motor built in accordance with the first embodiment of the present invention.

FIG. 1 is a side cross-sectional view of a motor built in accordance with the first embodiment of the present invention, and FIG. 2 is a plan view of the motor shown by FIG. 1.

Figure 15:
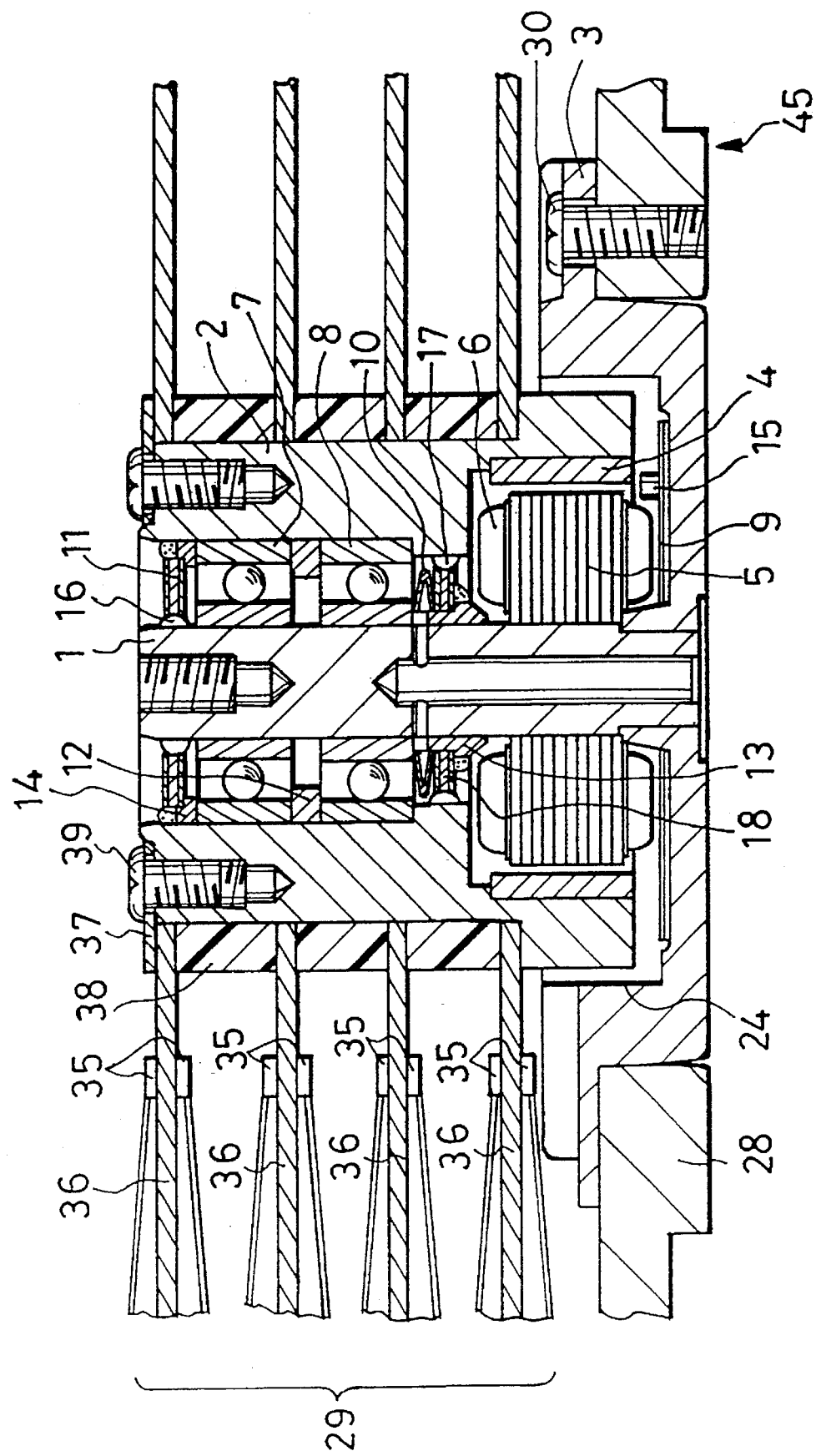
FIG. 15 is a cross-sectional side view of a prior art motor.
Figure 16:
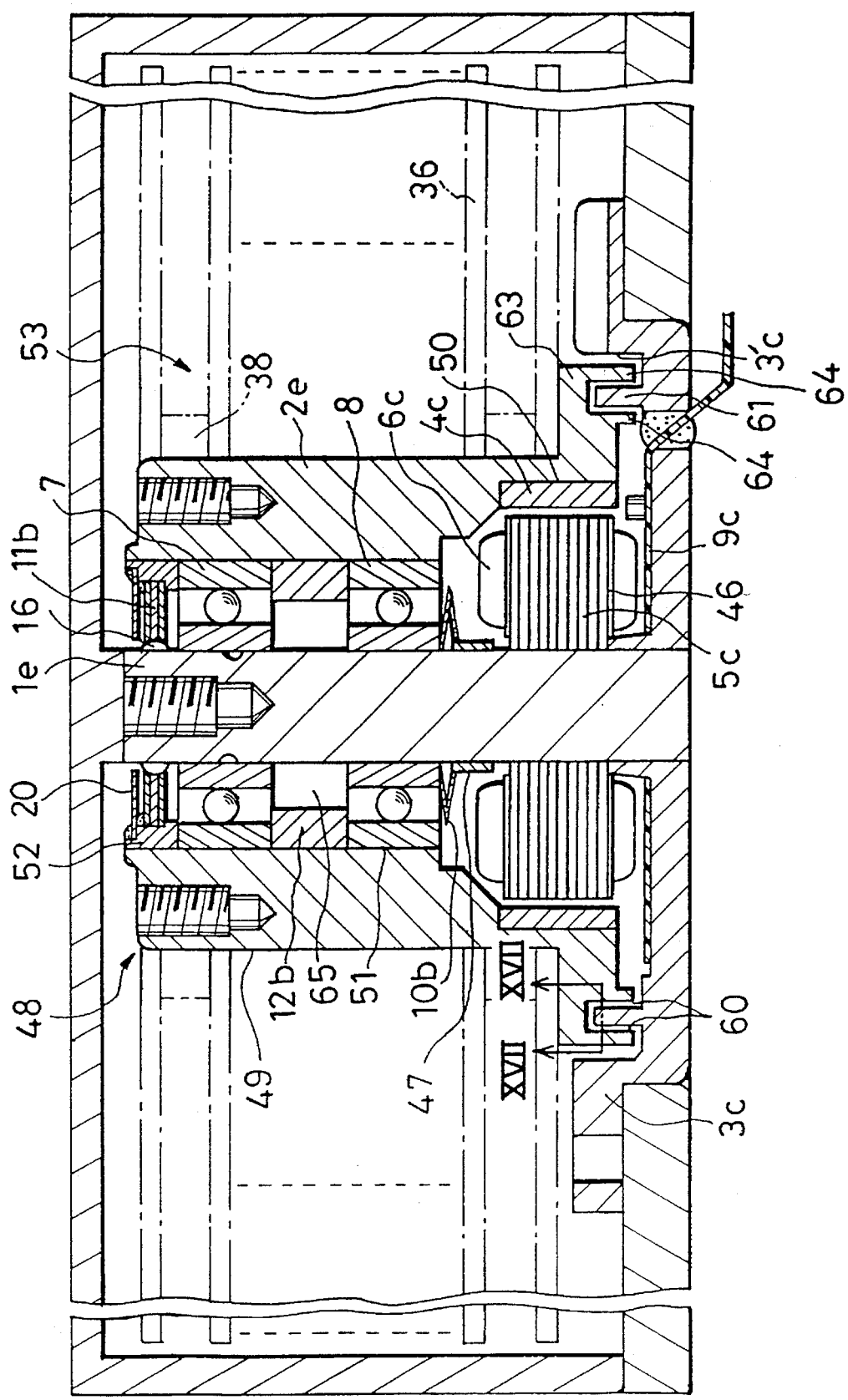
FIG. 16 is a cross-sectional side view of another prior art motor.
Figure 17:
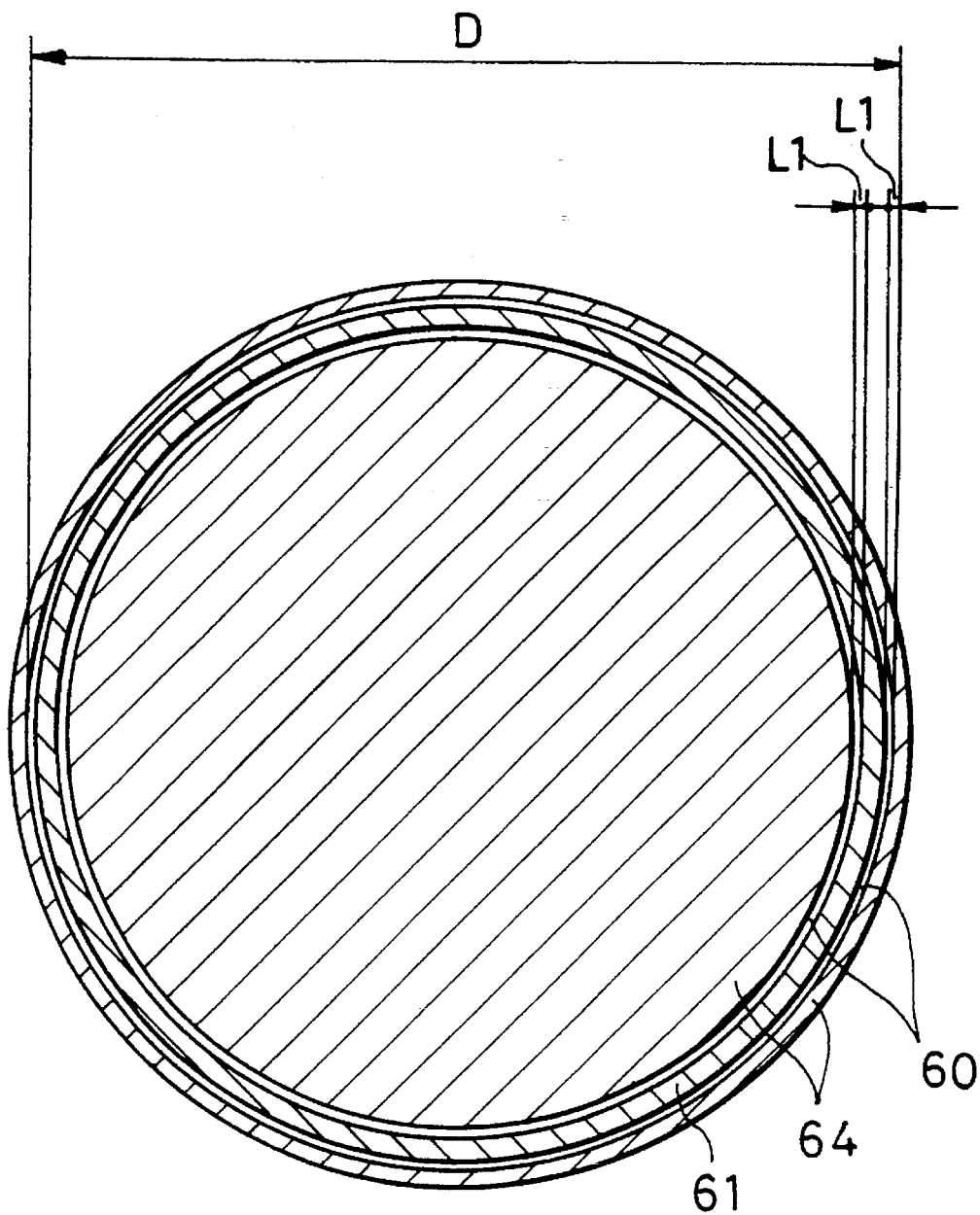
FIG. 17 is a cross-sectional plan view along a plane including the line X—X of FIG. 16.

In FIGS. 1 and 2, a spacer 12 is arranged between an upper bearing 7 and a lower bearing 8 having inner bearing seats (sleeves), to which a stationary shaft 1 is fit-in and secured thereto. A hub 2 for carrying and driving a plurality of magnetic disks 36 is rotatably supported on outer bearing seats of the bearings 7 and 8. A plurality of known disk spacers, which are like ones shown in FIG. 15, but not shown, are alternately stacked between known adjacent magnetic disks, and the stacked body is secured on the hub 2 by a known clamper (not shown) and clamper screws (not shown) to be screwed into threaded holes 39'.

A bracket 3 is secured on a chassis 28 of a magnetic disk drive unit with a fastening screw 30. The stationary shaft 1 is provided on the bracket 3 at its center and extends axially upward to its magnetic disk carrying region 29. The hub 2 has a cylindrical recess on its lower part, and a cylindrical rotor magnet 4 is fixed on the inner circumference of the cylindrical recess. The cylindrical rotor magnet 4 is polarized to have a known multiple polarized pole.

A stator core 5 is fixed also on the stationary shaft 1 at its lower part and is confronting to the rotor magnet 4 with a certain gap therebetween. A plurality of coils 6 are wound around the stator core 5. A stator base plate 9 is provided on the bracket 3. On the stator base plate 9, there is provided a position detecting device 15, such as a Hall device, which controls the excitation of the coils 6 in a manner that it can detect the magnetic flux of the rotor magnet 4, for controlling rotation of the motor.

A fluid sealing structure is provided for preventing the splash of grease aerosol from the upper bearing 7 and the lower bearing 8. The fluid sealing structure is configured by magnetically retaining a small quantity of magnetic fluid 16 injected into a clearance formed between the stationary shaft 1 and an upper magnetic fluid seal 11. The magnetic fluid is made and sold by Ferrofluidics Corp. U.S.A. or Nippon Ferrofluidics Corp. Japan, and a solution wherein very fine $Fe_3O_4$ powder of average particle diameter of about 100 Å is disclosed in an ester as base oil or solvent.

A magnetic fluid seal holder 14 is provided on the inner circumference of the hub 2 for retaining and positioning the upper magnetic fluid seal 11. Another sealing structure is provided by a lower magnetic fluid seal 18, a magnetic fluid seal holder 13 provided at a mid part of the stationary shaft 1, for positioning the lower magnetic fluid seal 18 to retain a small quantity of magnetic fluid 17 which is injected into a clearance formed between the magnetic fluid seal 18 and the inner circumference of the hub 2.

A preloading spring 10 is positioned in a clearance formed between the lower bearing 8 and the lower magnetic fluid seal holder 13. The preloading spring 10 is effective for maintaining the rigidity of the rotating body by imposing an appropriate axial preload on both the upper bearing 7 and the lower bearing 8, thus for preventing the generation of vibration during the rotation.

In this embodiment, a cylindrical shielding plate 19, made of a material having a high electric conductivity (for instance, copper or aluminum), is provided on an inner circumference of the cylindrical recess formed in the center of the bracket 3. In FIG. 2, the cross-hatching made on the cylindrical shielding plate 19 is only for indicating a range of the closed sector hereof, and does not indicate section thereof. A material having a high electrical conductivity such as copper or aluminum which forms the cylindrical shielding plate 19 is effective for reducing the electromagnetic noise and the PWM noise. Furthermore, by utilizing a material of high permeability such as permalloy for the cylindrical shielding plate 19, noise in the low frequency region, and noise leaking through the hub 2 can be suppressed. The bracket 3 is made of aluminum in a casting process, in view of its productivity and economics. Although it is not shown by the drawing, the same effect will be obtained when the shielding plate 19 is formed integrally with the cylindrical region 24 of the bracket 3 and with the same material.

EXAMPLE 2

Figure 3:
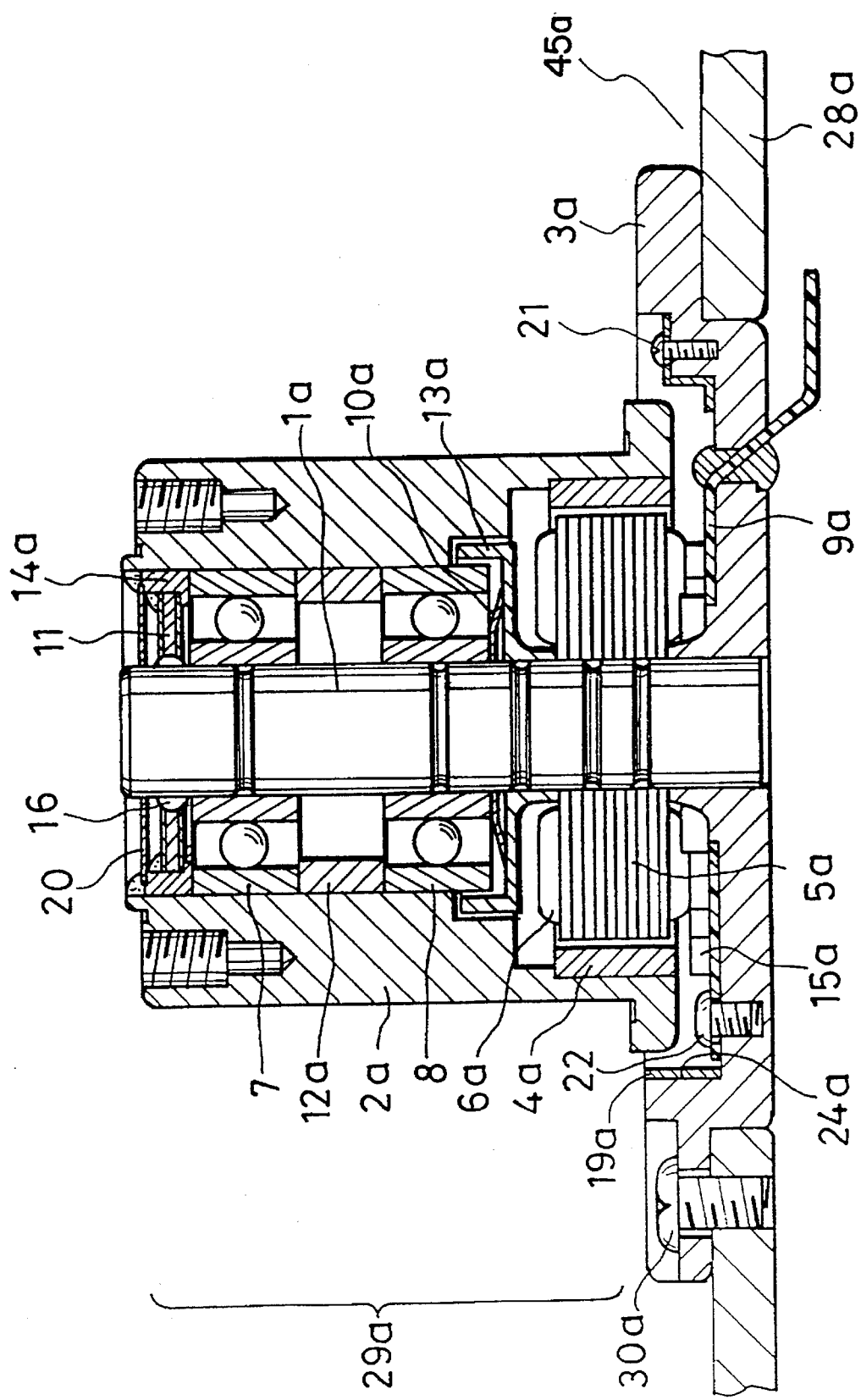
FIG. 3 is a cross-sectional side view of the motor built in accordance with a second embodiment of the present invention.
Figure 4:
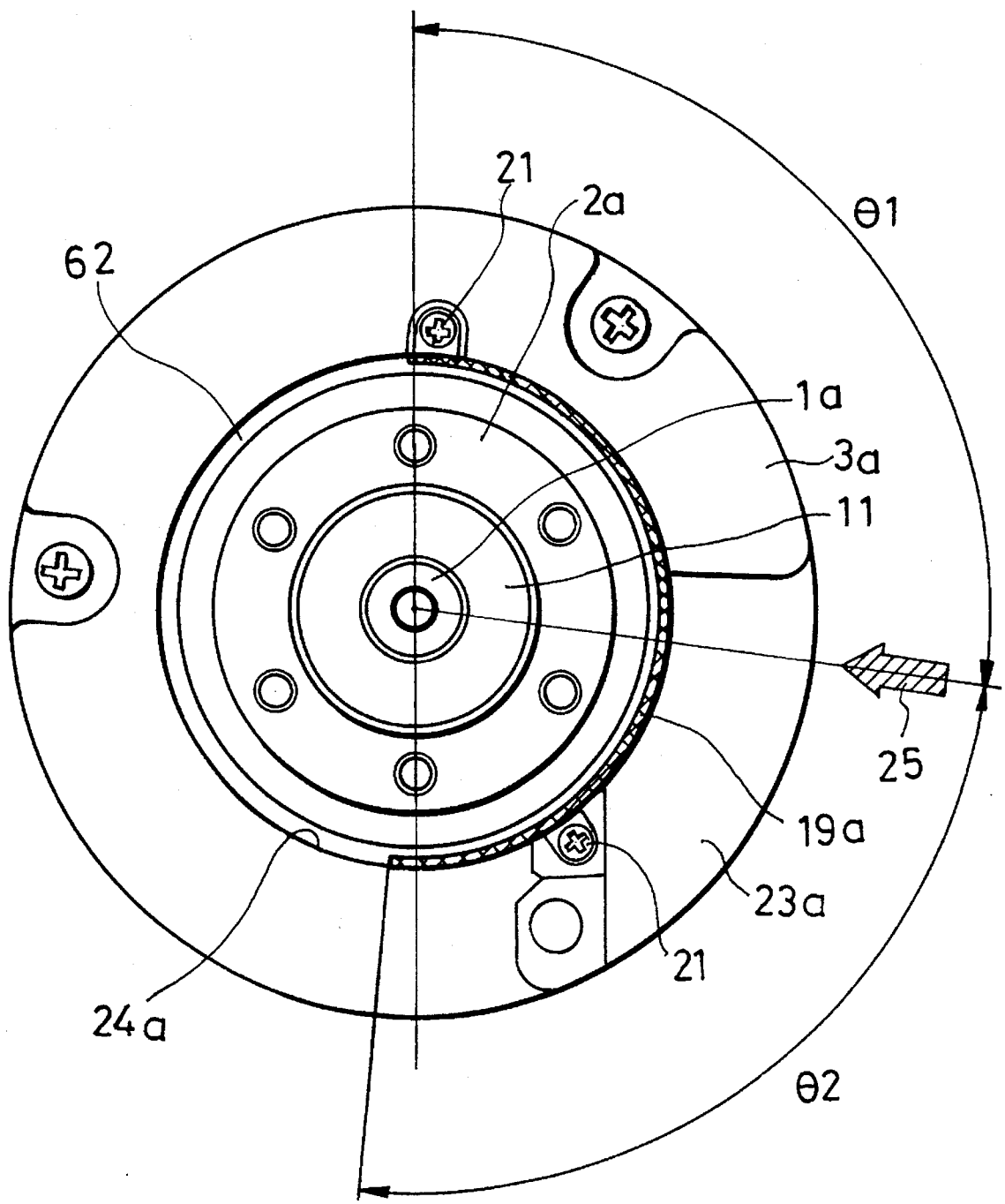
FIG. 4 is a plan view of the motor built in accordance with the second embodiment of the present invention.

FIG. 3 is a side cross-sectional view of a motor built in accordance with the second embodiment of the present invention, and FIG. 4 is a plan view of the motor shown by FIG. 3.

In FIGS. 3 and 4, a spacer 12a is located between the upper bearing 7 and the lower bearing 8 and a stationary shaft 1a is fitted in the inner bearing sheets of these bearings. Outer bearing sheets of both the upper and the lower bearings 7 and 8, and the spacer 12a are fitted in the hub 2a for carrying the magnetic disks 36 (not shown in FIGS. 3 and 4). The stationary shaft 1a is planted on and secured to the center of a bracket 3a and extends axially upward to the region 29a where the magnetic disks are mounted. The bracket 3a is mounted on a chassis 28a of a magnetic drive unit 45a and secured thereto by a fastening screw 30a. A cylindrical rotor magnet 4a is mounted on the inner circumference of a cylindrical recess formed in the hub 2a. A stator core 5a is fixed around the lower part of the stationary shaft 1a at a position which confronts to the rotor magnet 4a. Coils 6a are wound around the stator core 5a.

A stator base plate 9a is fixed on the bracket 3a by fastening screw 22 and carries a position detecting device 15a for controlling the excitation of the coils 6a. Above the upper bearing 7 and an upper part of the hub 2a, there is provided a magnetic fluid seal holder 14a for holding the upper magnetic fluid seal 11, which retains a small quantity of known magnetic fluid 16. On top of the hub 2a and above the magnetic fluid seal holder 14a, there is fixed the magnetic fluid protecting disc 20. At the mid part of the stationary shaft, there is provided a stepped collar 13a which serves to form a labyrinth structure for reducing the radial gap between the stepped collar 13a and the hub 2a, and that between the stepped collar 13a and the lower bearing 8. Thereby the splash of the grease aerosol from the upper and the lower bearings 7 and 8 is prevented. A proloading spring 10a is inserted between the lower bearing 8 and the stepped collar 13a for imposing an axial proload on the upper bearing 7 and the lower bearing 8.

A cylindrical shielding plate 19a is made of a material having a high permeability and has an open sector 62 and closed sector indicated by cross-hatching. The cylindrical shielding plate 19a is fixed on the inner circumference of cylindrical recess 24a formed on the bracket 3a by fastening screws 21. As specifically shown by FIG. 4, the closed sector of the cylindrical shielding plate 19a is located at such part of the inner circumference of the cylindrical recess 24a which is nearer to a head access region shown by an arrow 25. The head access region is the region wherealong a read/write head moves to access the data stored on the surface of the magnetic disk. In FIG. 4, the cross-hatching made on the cylindrical sheilding plate 19a is only for indicating a range of the closed sector thereof, and does not indicate section thereof. On both sides of the arrow 25, the closed sector of the cylindrical shielding plate 19a circumferentially extends almost equal for the angles θ1 and θ2.

The motor in accordance with this Example 2 has such a technical advantage that a noise shielding effect by the sector cylindrical shielding plate 19a is good, since the close angles θ1 and θ2 are selected substantially equal to each other.

EXAMPLE 3

Figure 5:
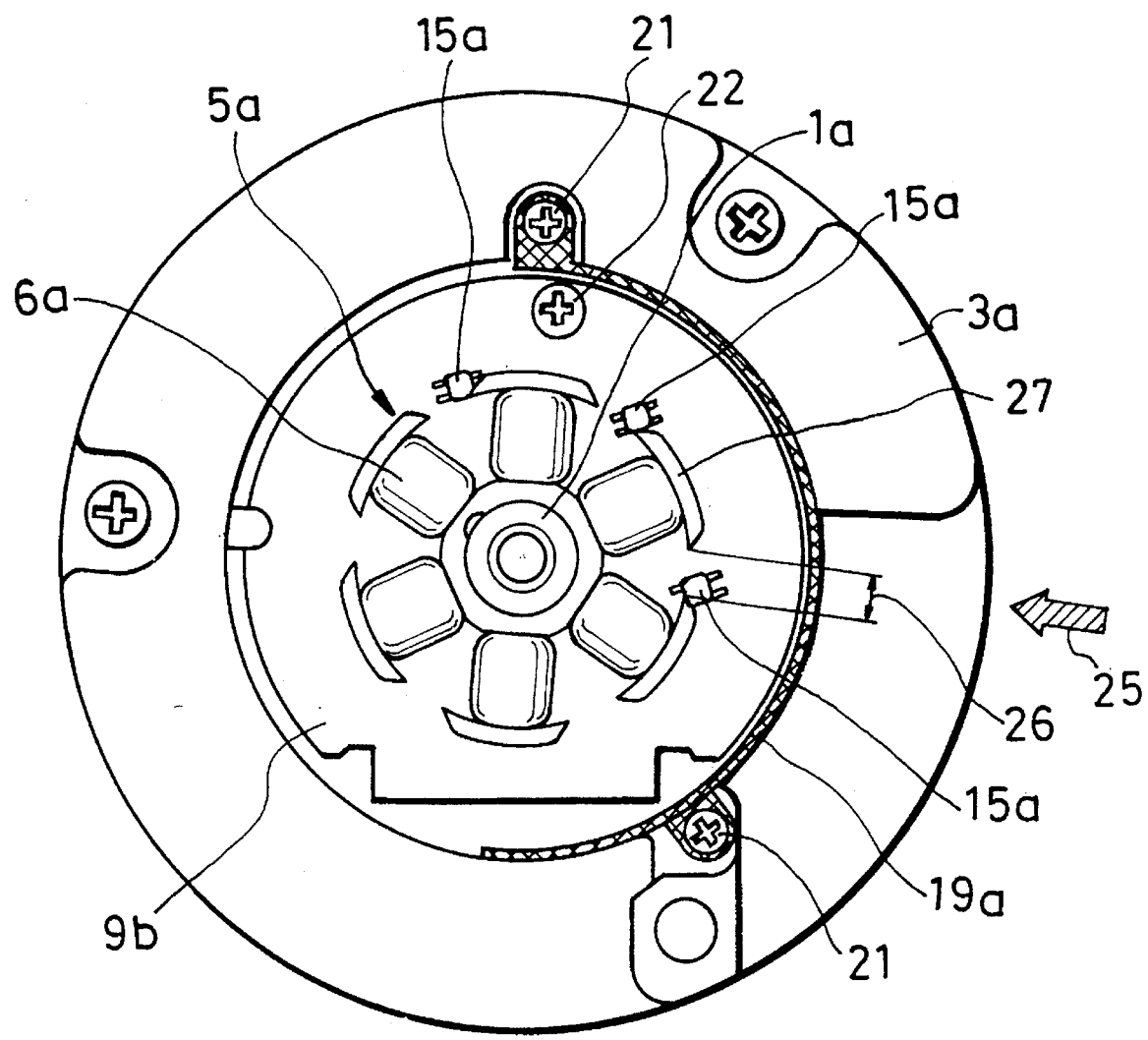
FIG. 5 is a partly cross-sectional plan view of the motor built in accordance with a third embodiment of the present invention.

FIG. 5, is a plan view of only the stationary components of a third embodiment of the present invention, wherein parts and components identical with those in the second embodiment will be referred to by the same reference symbols and the description therefor will be omitted.

In FIG. 5, the stator base plate 9a is fixed on the bracket 3a by the fastening screw 22. Open sectors 26 and pole pieces 27 are arranged circumferentially and alternately on the stator core 5a around the stationary shaft 1a. The direction shown by an arrow 25 along which the read/write head moves to access the data stored on the surface of the magnetic disk is identical with the radial centerline of one of the open sectors 26 between the adjacent pole pieces of the stator core 5a.

In FIG. 5, the cross-hatching made on the cylindrical shielding plate 19a is only for indicating a range of the closed sector hereof, and does not indicate section thereof.

The motor in accordance with this Example 3 has such a technical advantage in that noise induced on the head is much decreased because of positioning the open sector part 26 (whereat PWM noise is minimum) of the cylindrical shielding plate 19a directed towards the head access direction 25.

EXAMPLE 4

Figure 6:
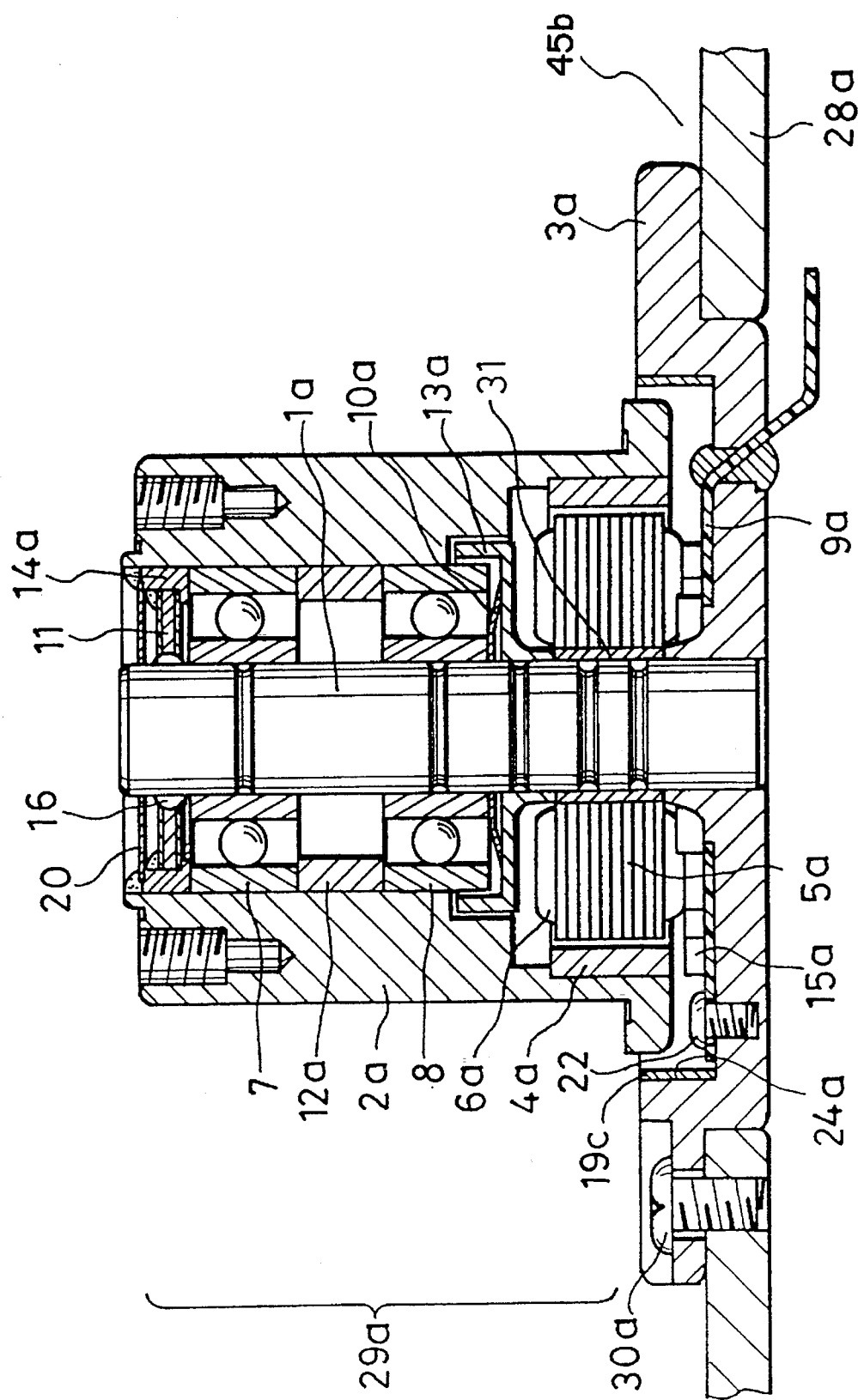
FIG. 6 is a cross-sectional side view of the motor built in accordance with a fourth embodiment of the present invention.

FIG. 6 is a side cross-sectional view of the motor built in accordance with the fourth embodiment of the present invention, wherein parts and components identical with those in the second embodiment will be referred to by the same reference symbols, and the description therefor will be omitted.

In FIG. 6, a cylindrical shielding plate 19c is fixed on the cylindrical recess 24a of the bracket 3a. A cylindrical boss 31 made of a material having a high electric conductivity such as copper and aluminum is inserted between the stationary shaft 1a and the stator core 5a. The cylindrical boss 31 is effective for suppressing the electromagnetic noise and the PWM noise. The rigidity of the rotating body is increased by employing a resin as the material for the magnetic fluid seal holder 14a.

Figure 7A:
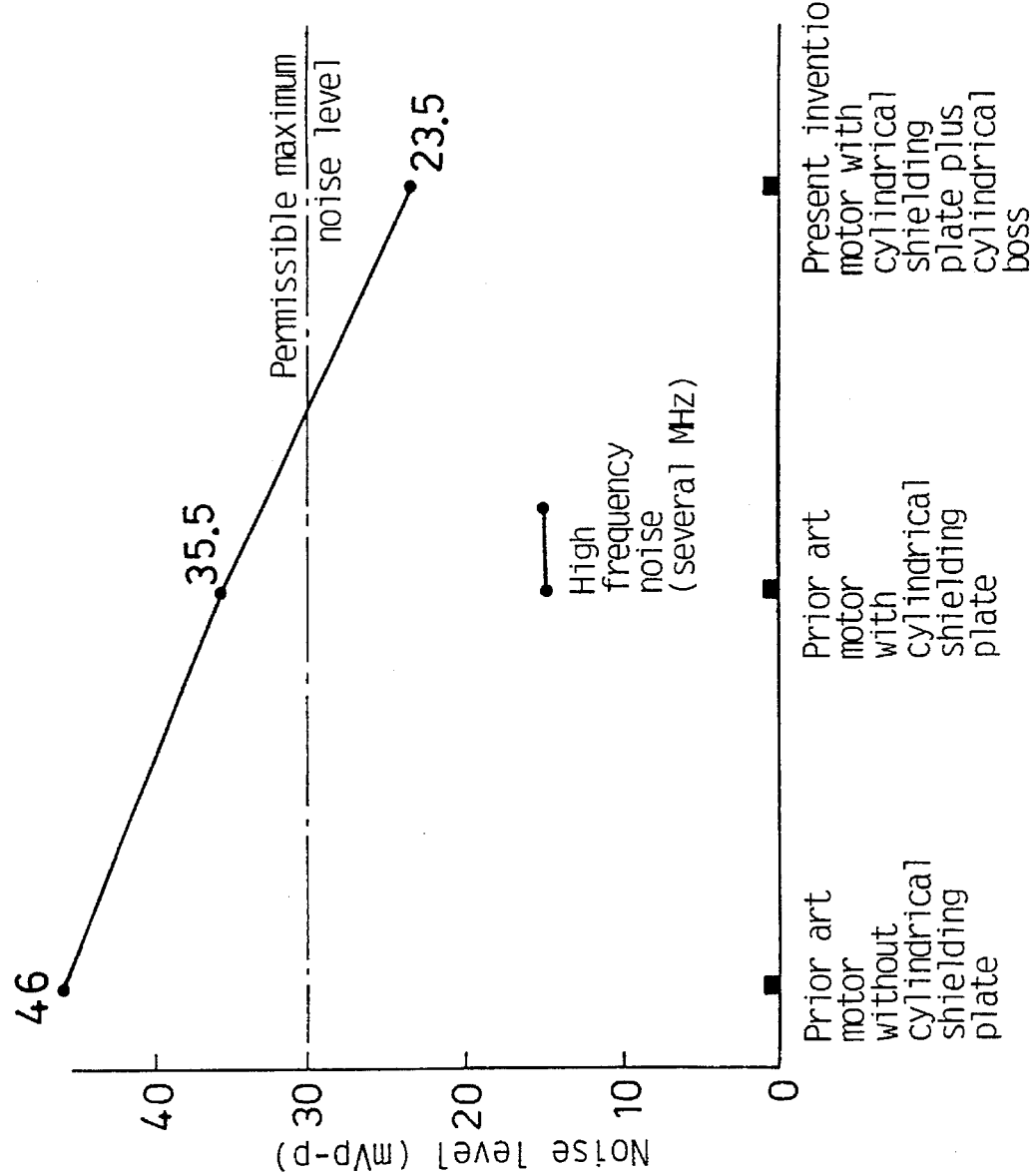

The PWM noise of the thus configured motor will now be described by referring to FIG. 7A. The graph of FIG. 7A shows a result of a comparison of the motor of the present invention with the prior art motor (without cylindrical shielding plate 19) with respect to the high frequency noises which are the harmonic components of the PWM noise. As clearly shown by FIG. 7A, the high frequency noise generated from the motor built in accordance with this embodiment is improved and almost halved from 46 mV p-p of the prior art motor to 23.5 mV p-p of the embodiment, which is sufficiently below the permissible value of 30 mV p-p. Thus, the motor of this embodiment has excellent performance.

EXAMPLE 5

Figure 8:
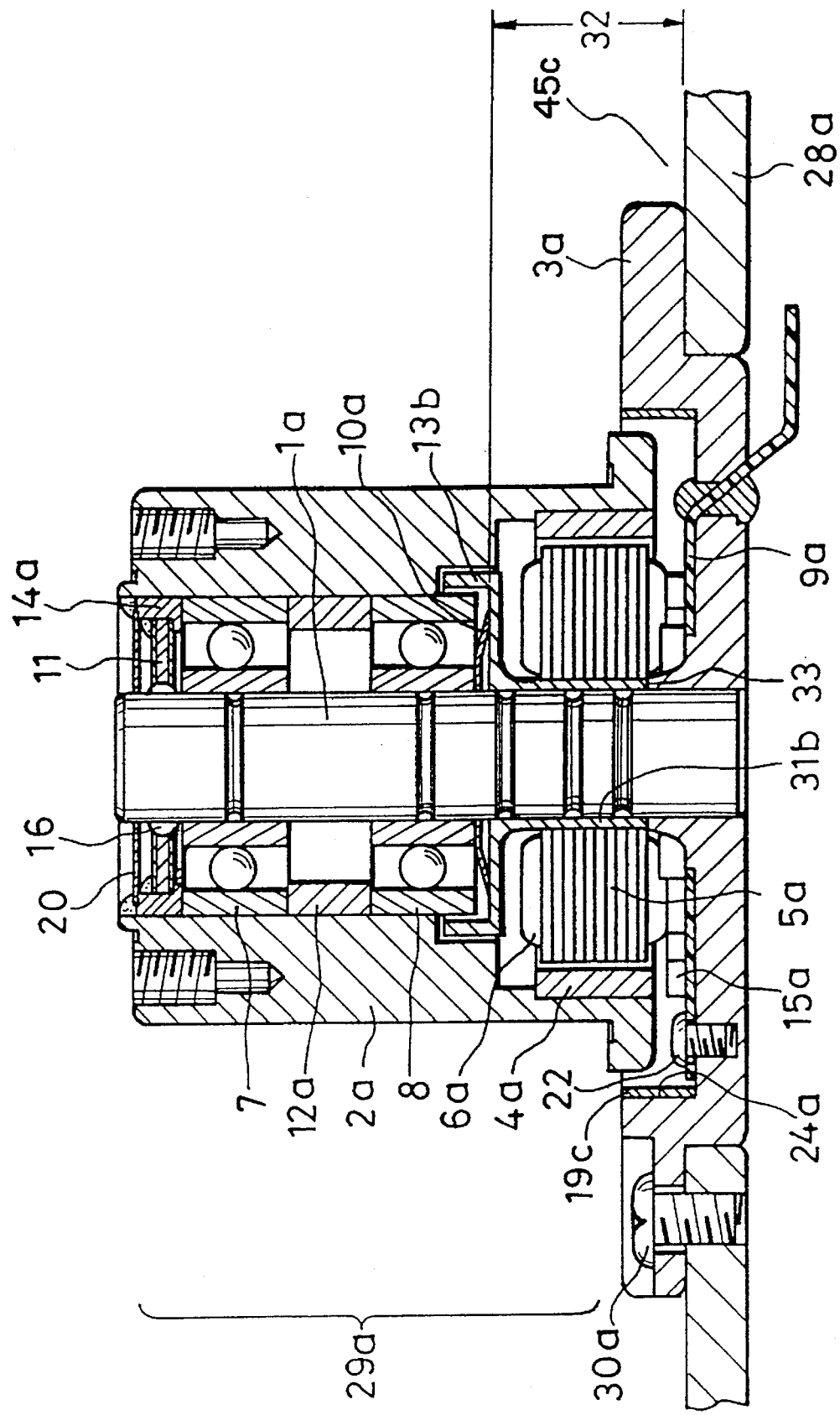
FIG. 8 is a cross-sectional side view of the motor built in accordance with a fifth embodiment of the present invention.

FIG. 8 is a side cross-sectional view of the motor built in accordance with a fifth embodiment of the present invention, wherein the parts and components identical with those in the second embodiment will be referred to by the same reference symbols, and the description therefor will be omitted.

Different from the fourth embodiment shown in FIG. 6, the motor shown in FIG. 8 has a cylindrical boss 31b which is integrally formed with the stepped collar 13b and which extends fully between the stationary shaft 1a and stator core 5a. The stepped collar 13b extends radially from the cylindrical boss 31b. In order to secure,the accuracy of the height 32 of the stepped collar 13b from the chassis 28a of the magnetic disk drive unit, the lower end of the boss 31b is made to contact the bracket 3a at the contacting face 33. Like in the case of the fourth embodiment, the combined body of the stepped collar 13b and the boss 31b is made of a material having a high electric conductivity such as copper or aluminum, and thus is effective for shielding the electromagnetic noise and the PWM noise. Similar to the fourth embodiment, the fifth embodiment results in an acceptable value (23.5 mV p-p) of the PWM noise.

EXAMPLE 6

Figure 9:
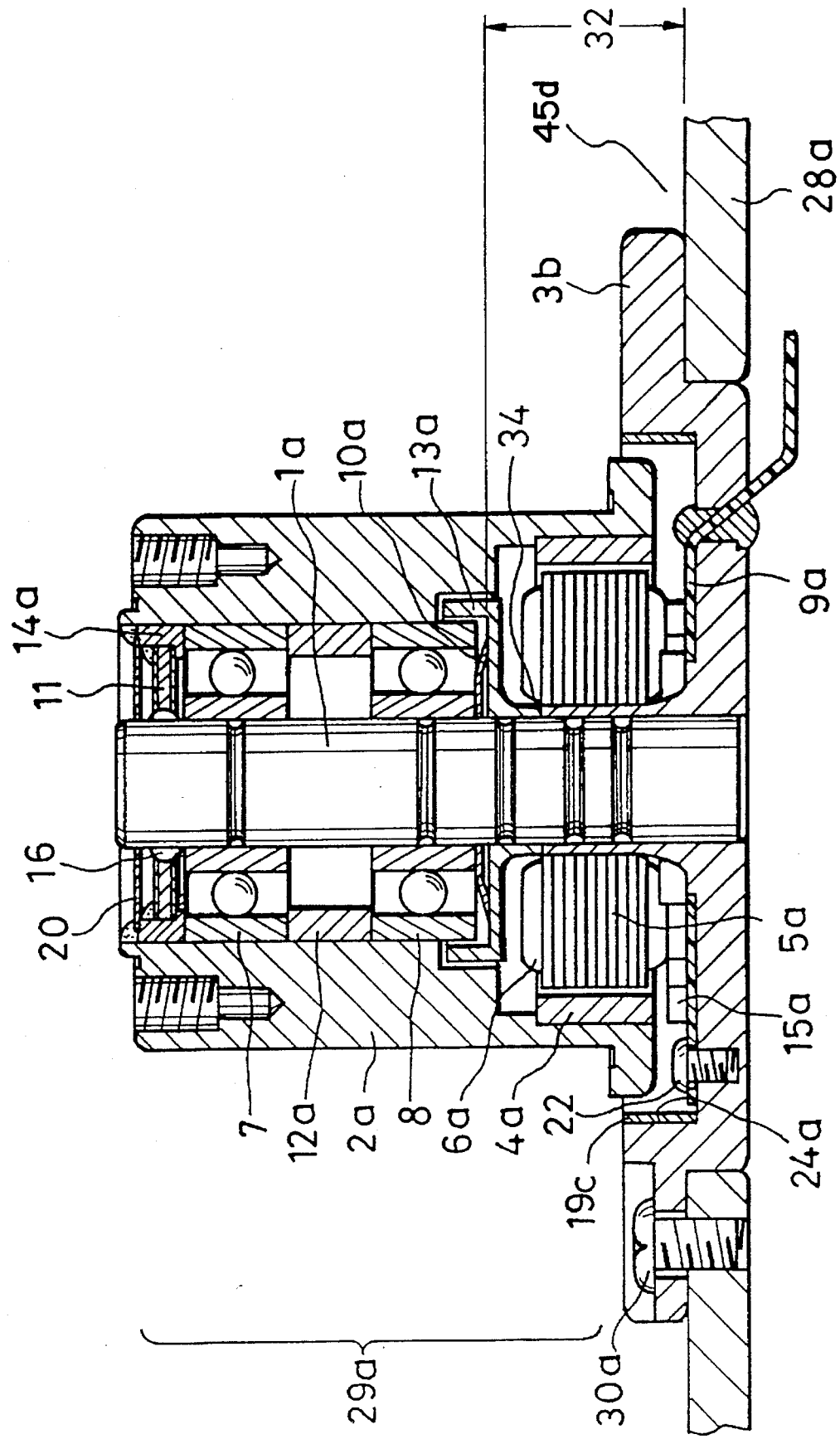
FIG. 9 is a cross-sectional side view of the motor built in accordance with a sixth embodiment of the present invention.

FIG. 9 is a side cross-sectional view of the motor built in accordance with a sixth embodiment of the present invention, wherein parts and components identical with those in the second embodiment will be referred to by the same reference symbols and the description therefor will be omitted.

Different from the foregoing embodiments shown in FIGS. 1, 3, 6 and 8, the motor shown in FIG. 9 has a bracket 3b having a center navel in which the stationary shaft 1a fits and is secured there. The center navel extends axially upward and sufficiently for carrying the stator core 5a. In order to ensure the accuracy of the height 32 of the stepped collar 13a from the chassis 28a of the magnetic disk driving unit, the bottom end of the stepped collar 13a is made to contact the center navel at the contacting face 34. The center navel is formed integrally with the bracket 3b and is made of a material having a high electric conductivity and thus is effective for shielding the electromagnetic noise and the PWM noise. In most cases, the bracket 3b is manufactured in a casting process using aluminum, so as to improve productivity and manufacturing cost.

Similar to the fourth embodiment, the sixth embodiment results in an acceptable value (23.5 mV p-p) of the PWM noise.

EXAMPLE 7

Figure 10:
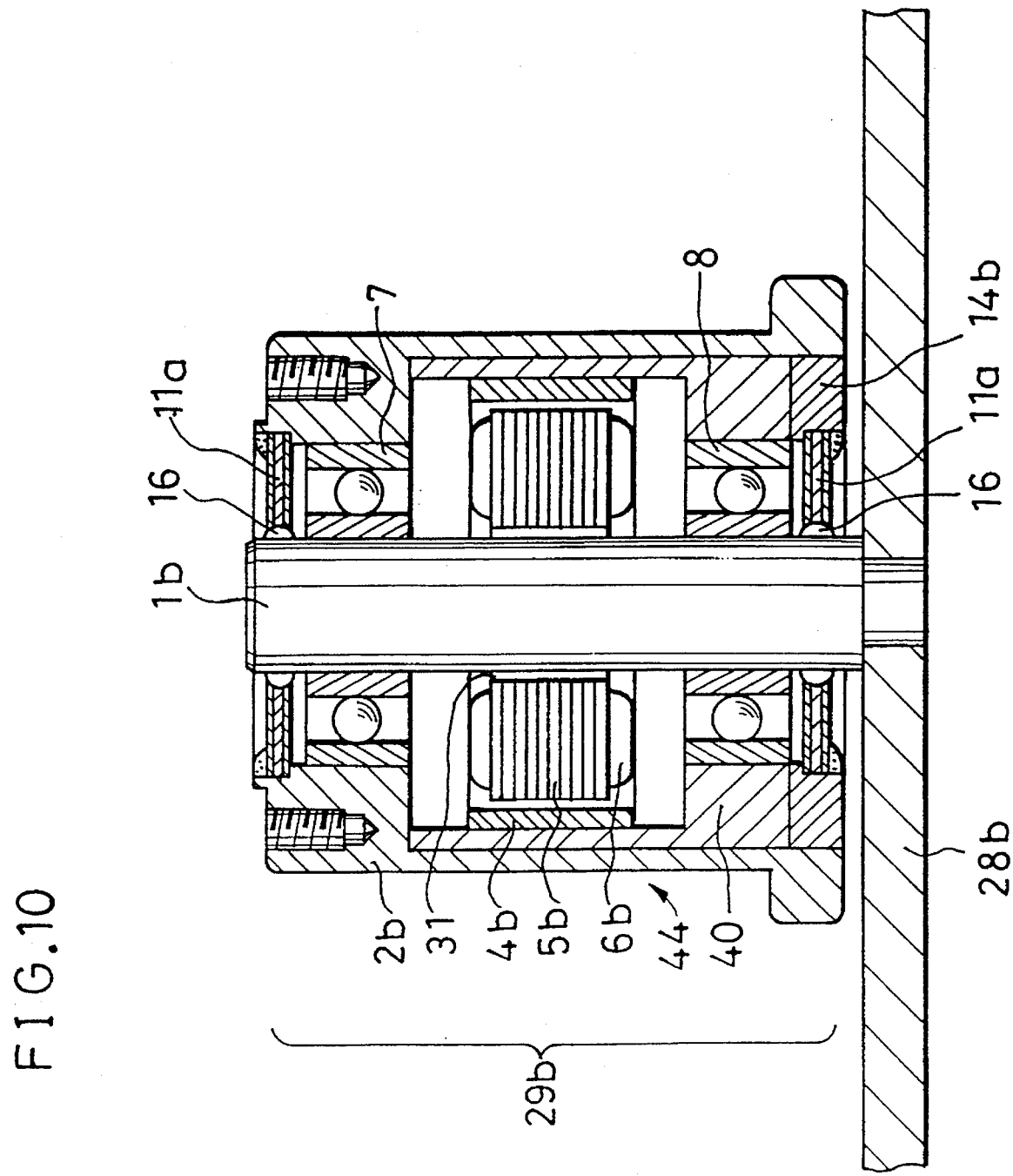
FIG. 10 is a cross-sectional side view of the interior of the motor built in accordance with a seventh embodiment of the present invention.

FIG. 10 is a side cross-sectional view of the motor built in accordance with the seventh embodiment of the present invention, wherein parts and components identical with those in the foregoing embodiment will be referred to by the same reference symbols and the description therefor will be omitted.

In FIG. 10, a stationary shaft 1b of the motor is directly secured on a chassis 28b of the magnetic disk driving unit and extends axially upward to the magnetic disk region 29b. A hub 2b made of a non-ferromagnetic material for carrying the magnetic disks has a stepped cylindrical recess having two different diameter regions and is mounted rotatably around the stationary shaft 1b through the upper bearing 7 fitted in the stepped cylindrical recess at its small diameter region. A bush 40 is telescopically fitted in the large diameter region 44 of the stepped cylindrical recess of the hub 2b, and the bush 40 itself has a stepped cylindrical recess of large and small diameter regions. On the inner circumference of the large diameter region of the stepped cylindrical recess provided on the bush 40, there is mounted a rotor magnet 4b at a position which corresponds to the large diameter region 44 of the stepped cylindrical recess of the hub 2b, and the lower bearing 8 is fitted in its small diameter region.

A stator core 5b is secured around the stationary shaft 1b through a cylindrical boss 31, and located at its mid part which confronts to the rotor magnet 4b between the upper bearing 7 and the lower bearing 8. Coils 6b are wound around the stator core 5b. Magnetic fluid seals 11a are located above the upper bearing 7 and beneath the lower bearing 8. The upper magnetic fluid seal 11a arranged above the upper bearing 7 is secured to the hub 2b, whereas the lower magnetic fluid seal 11a arranged beneath the lower bearing 8 is secured on a magnetic fluid seal holder 14b, which is fixed on the inner circumference of the large diameter region of the cylindrical recess formed in the bush 40. After being injected into spaces formed between the magnetic fluid seals 11a and the stationary shaft 1b, the magnetic fluid 16 is magnetically retained and prevents the splash of the grease aerosol from the upper bearing 7 and from the lower bearing 8. The cylindrical boss 31 is made of a material having a high electric conductivity such as copper or aluminum, and thus, is effective for shielding the electromagnetic noise and the PWM noise.

Similar to the fourth embodiment, the seventh embodiment is found to be effective for reducing the PWM noise.

EXAMPLE 8

Figure 11:
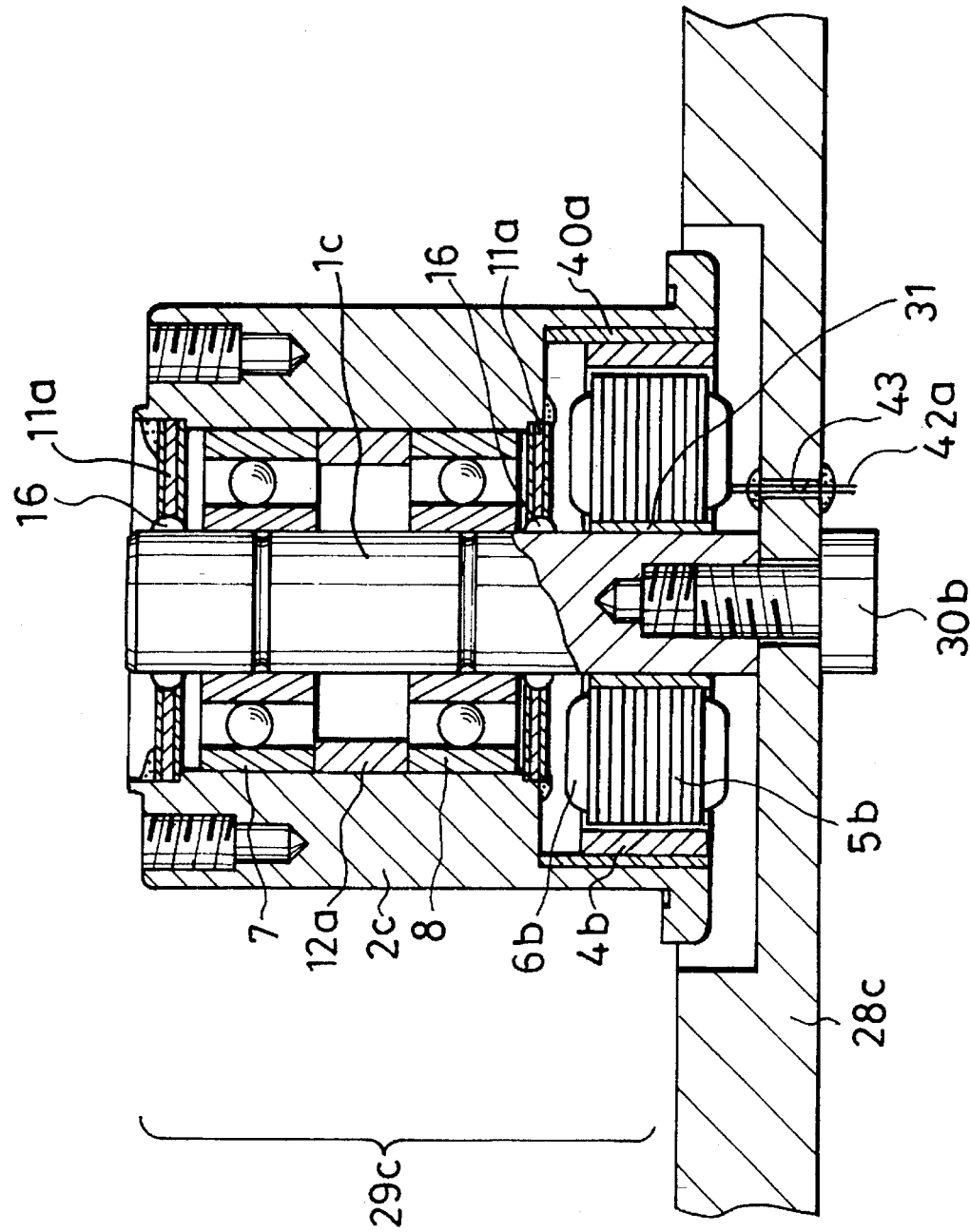
FIG. 11 is a cross-sectional side view of the interior of the motor built in accordance with an eighth embodiment of the present invention.

Referring now to FIG. 11, there is shown a side cross-sectional view of the motor built in accordance with the eighth embodiment of the present invention, wherein the parts and components identical with those in the foregoing embodiment will be referred to by the same reference symbols and the description therefor will be omitted.

In FIG. 11, a stationary shaft $1c$ of the motor is directly secured on the center of the chassis $28c$ of the magnetic disk drive unit by a fastening screw $30b$, and extends axially upward to a magnetic disk region $29c$. A spacer $12a$ is located between the upper bearing 7 and the lower bearing 8 which are supported by the stationary shaft $1c$. A hub $2c$ for carrying the magnetic disks is mounted around the stationary shaft $1c$ through the upper and lower bearings 7 and 8. A rotor frame $40a$ is fitted in a cylindrical recess formed in the hub $2c$, and a cylindrical rotor magnet $4b$ is mounted on the inner circumference of the cylindrical recess of the rotor frame $40a$, and thus fixed on the hub $2c$.

A stator core $5b$ is fixed around the stationary shaft $1c$ through a cylindrical boss 31, and located at a position that confronts to the rotor magnet $4b$. Coils $6b$ are wound around the stator core $5b$ and their terminals are connected to lead wires $42a$, which communicate to outer circuits through a throughhole 43 provided on the chassis $28c$.

The magnetic fluid seals $11a$ are located above the upper bearing 7 and beneath the lower bearing 8, and are secured to the hub $2c$. They magnetically retain the magnetic fluids 16 injected into the spaces formed between each of the magnetic fluid seals $11a$ and the stationary shaft $1c$, thereby preventing the splash of the grease aerosol from the upper bearing 7 and the lower bearing 8. The cylindrical boss 31 is made of a material having a high electric conductivity such as copper or aluminum and is inserted between the stationary shaft $1c$ made of stainless steel and the stator core $5a$.

The PWM noise of the thus configured motor will now be described by referring to FIG. 7B. FIG. 7B shows a result of comparison between the motor of the 8-th example of the present invention and the prior art motor equipped with a cylindrical shielding plate $19a$, with respect to the high frequency noise of several MHz which is the harmonic component of the PWM noise.

As clearly shown by FIG. 7B, the high frequency noise generated from the motor built in accordance with the eighth embodiment is improved to 30 mV p-p, as compared with 35.5 mV p-p of the prior art motor. This value of 30 mV p-p narrowly satisfies the permissible value. From the result of this comparison, it is found that the cylindrical boss 31 has a larger effect than that of the cylindrical shielding plate $19a$.

EXAMPLE 9

Figure 12:
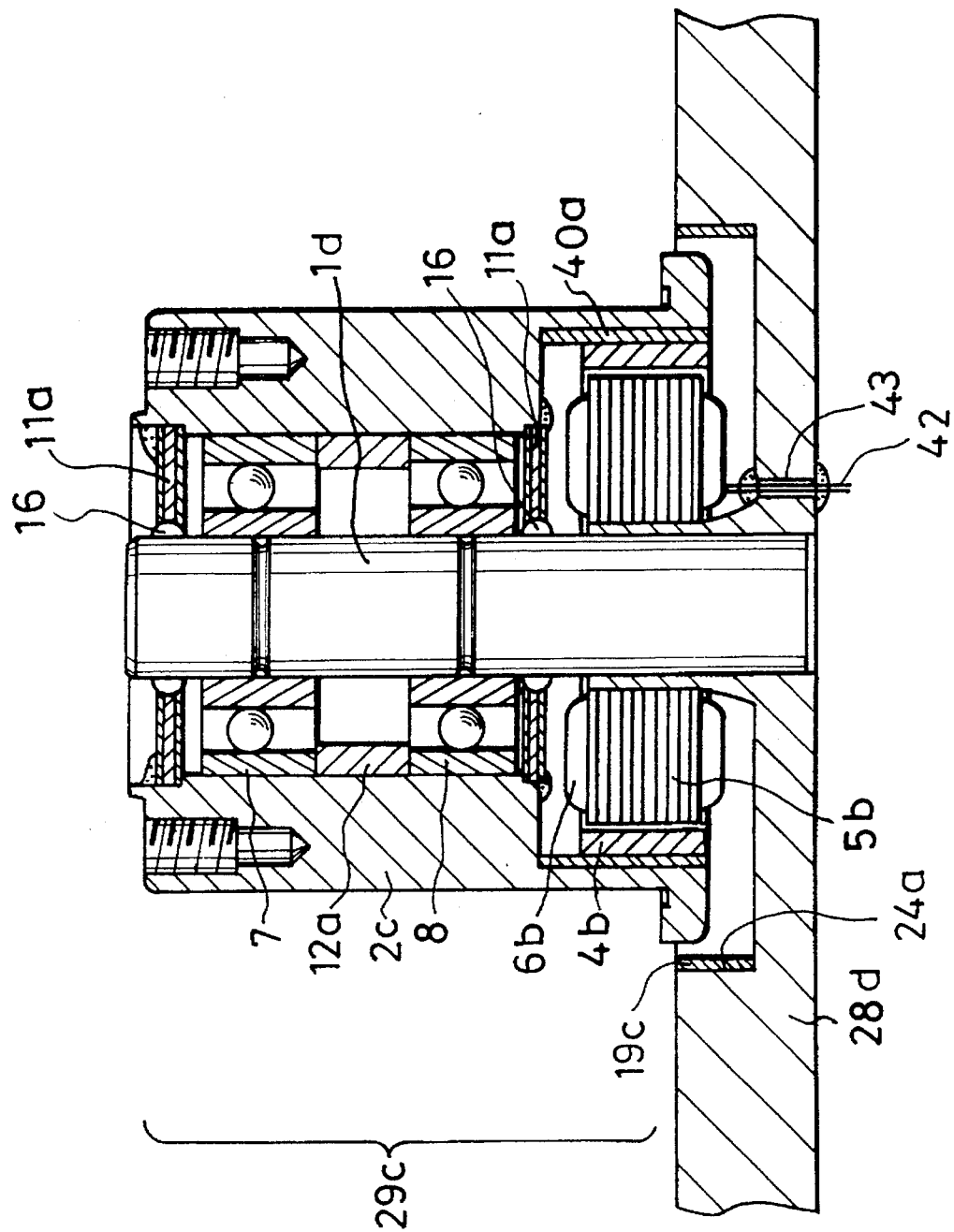
FIG. 12 is a cross-sectional side view of the interior of the motor built in accordance with a ninth embodiment of the present invention.

Referring now to FIG. 12, there is shown a side cross-sectional view of the motor built in accordance with the ninth embodiment of the present invention, wherein the parts and components identical with those in the 8-th example will be referred to by the same reference symbols and the description therefor will be omitted.

As shown in FIG. 12, a stationary shaft $1d$ of the motor is fitted in a center navel which is formed integrally with the chassis $28d$ of the magnetic disk driving unit. The center navel extends axially upward and sufficiently to carry the stator core $5b$ therearound. A cylindrical shielding plate $19c$ is fixed on the inner circumference of a cylindrical recess formed on the chassis $28d$. The chassis $28d$ is made of a material having a high electric conductivity such as copper and aluminum which is effective for shielding the electromagnetic noise and the PWM noise. In most cases, the chassis $28d$ is manufactured together with its center navel, in a casting process in order to improve productivity and manufacturing cost.

A similar effect of reducing the PWM noise as that held by the 4-th example is obtained with thus 9-th example.

EXAMPLE 10

Figure 13:
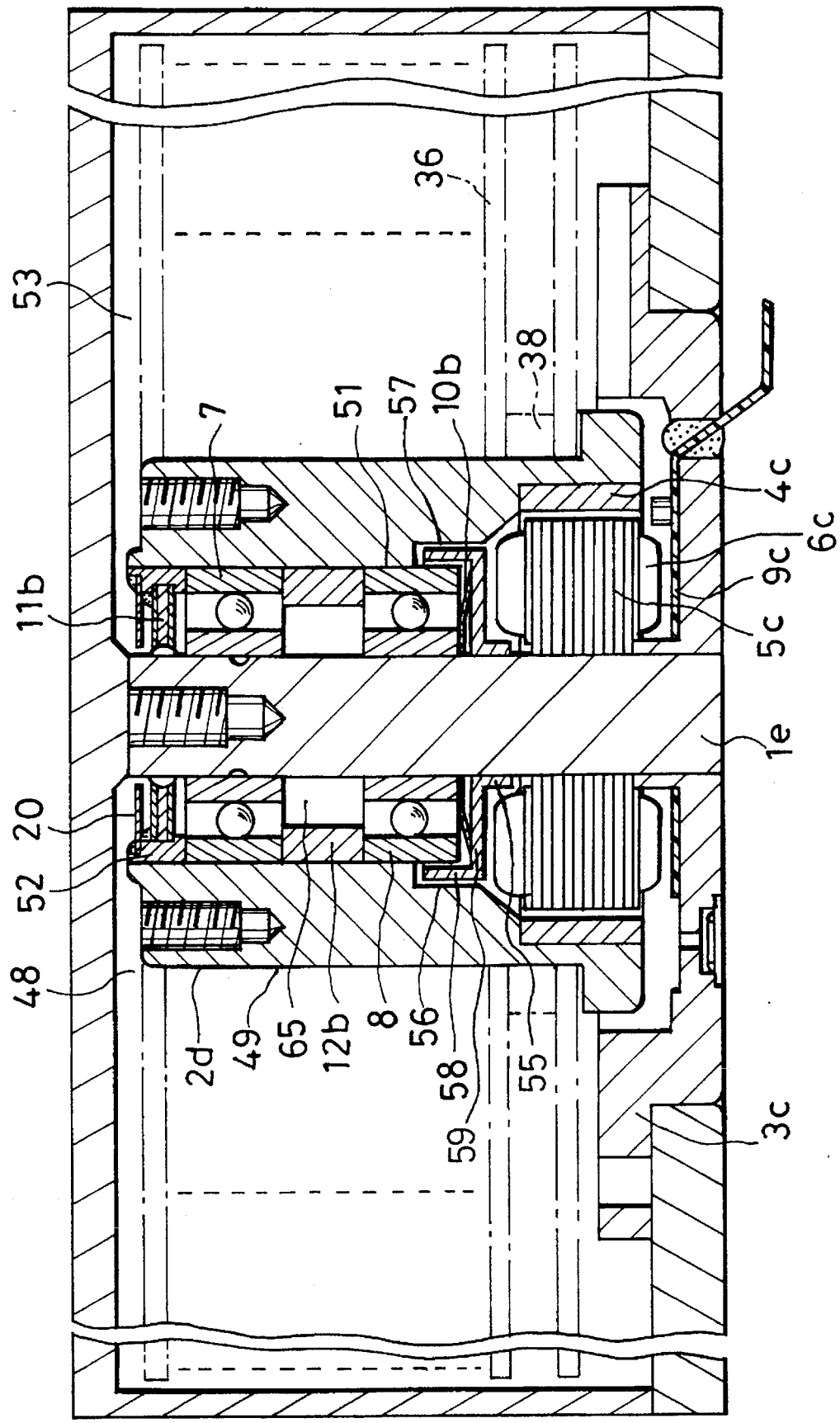
FIG. 13 is a cross-sectional side view of the magnetic disk drive unit built in accordance with a tenth embodiment of the present invention.
Figure 14:
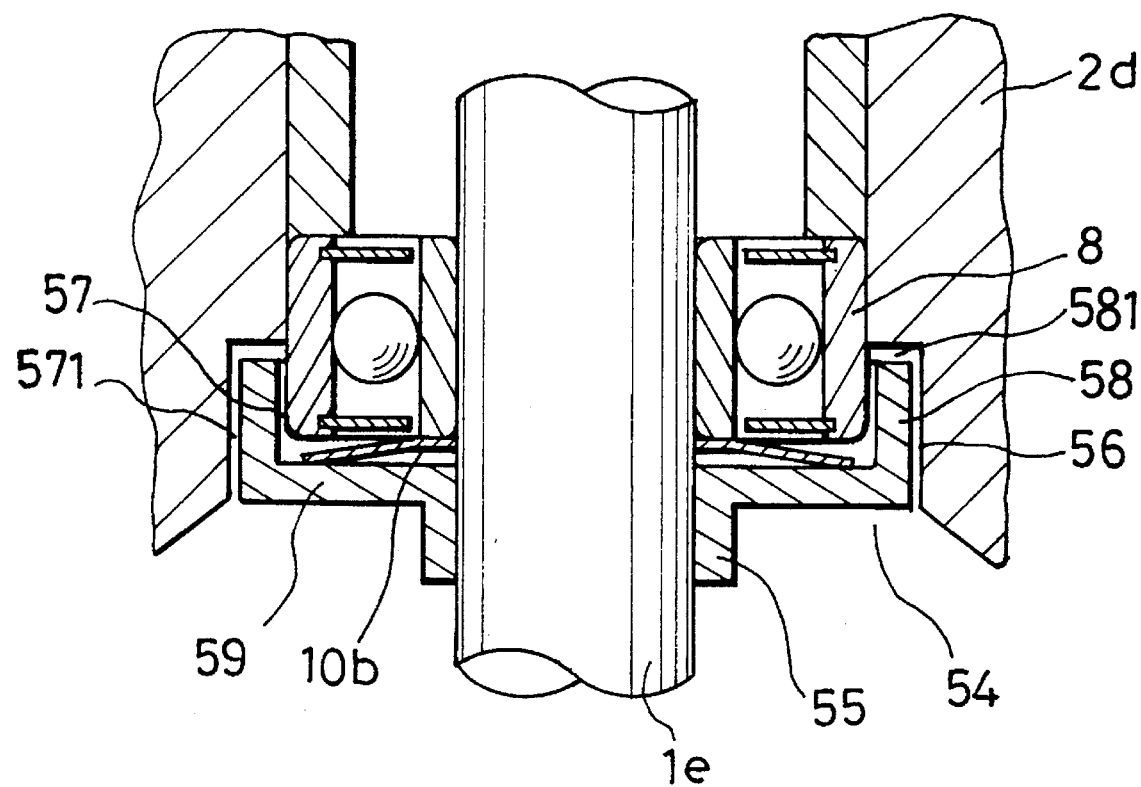
FIG. 14 is an enlarged cross-sectional side view for illustrating the labyrinth structure of the unit shown in FIG. 13.

FIGS. 18 and 14 are cross-sectional side views of a motor built in accordance with the tenth embodiment of the present invention. In FIGS. 13 and 14, a stepped collar 54 comprises a center navel 55, a flat flange 59 and a crown edge 58. The center navel 55 extends axially below the flat flange 59 and is fixed to a stationary shaft $1e$ at its mid part above the stator core $5c$. The stationary shaft $1e$ fits in the center opening of the bracket $3c$ and is secured thereto. The flat flange 59 serves for positioning a preloading spring $10b$ for imposing an axial preload on the lower bearing 8. The crown edge 58 extends axially upward to form an annular cylinder, so that it enters into an annular cylindrical space 581 formed between the outer circumference of the lower bearing 8 and the inner circumference 56 of the cylindrical recess of the hub $2d$. Thereby minute clearances 57 and 571 are formed on the inner and the outer faces of the crown edge 58. The minute clearances 57 and 571 thus form a labyrinth structure effective for shutting off the flow of air.

The motor in accordance with this Example 10 has such a good technical advantage that the labyrinth formed by the narrow clearances 57 and 571 effectively shut off the air flow, thereby effectively preventing dispersion of fine grease particles at the parts of the upper bearing 7 and the lower bearing 8.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electric motor for driving a magnetic disk, comprising:

a bracket secured to and fixed on a magnetic disk driving unit;

a stationary shaft fixed on said bracket and extending axially to a region where said magnetic disk is accommodated;

a hub for carrying and rotating said magnetic disk;

at least one bearing supported by said stationary shaft, for rotatably holding said hub;

a rotor magnet provided on an inner circumference of said hub, for generating a rotational force on said hub;

a stator core with a plurality of coils provided on said stationary shaft at a position which confronts to said rotor magnet; and a cylindrical shielding plate provided on an inner circumference of a cylindrical recess formed on said bracket.

2. An electric motor for driving a magnetic disk in accordance with claim 1, wherein said cylindrical shielding plate is formed of a material having at least one of a high electric conductivity and a high permeability.

3. An electric motor for driving a magnetic disk in accordance with claim 1, wherein:

said cylindrical shielding plate is formed of a same material as a material of said bracket; and said cylindrical shielding plate is molded integrally with said bracket.

4. An electric motor for driving a magnetic disk in accordance with claim 3, wherein said material is one of aluminum and an aluminum alloy.

5. An electric motor for driving a magnetic disk in accordance with claim 1, wherein said cylindrical shielding plate is formed of a material having a high magnetic permeability, and has an open sector along a circumference therof.

6. An electric motor for driving a magnetic disk in accordance with claim 5, wherein a direction of moving a read/write head for accessing said magnetic disk is arranged to coincide with a radial centerline of a closed sector in said cylindrical shielding plate.

7. An electric motor for driving a magnetic disk in accordance with claim 1, wherein a direction of moving a read/write head for accessing said magnetic disk is arranged to coincide with an open sector between adjacent pole pieces of said stator core.

8. An electric motor for driving a magnetic disk in accordance with claim 1, wherein said cylindrical shielding plate extends fully between said stationary shaft and said stator core in said axial direction.

9. An electric motor for driving a magnetic disk, comprising:

a bracket secured to and fixed on a magnetic disk driving unit;

a stationary shaft fixed on said bracket and extending in an axial direction to a region where said magnetic disk is accommodated;

a hub for carrying and rotating said magnetic disk;

at least one bearing supported by said stationary shaft, for rotatably holding said hub;

a rotor magnet provided on an inner circumference of said hub, for generating a rotational force on said hub;

a stator core with a plurality of coils provided on said stationary shaft at a position that confronts to said rotor magnet; and a cylindrical boss extending fully between said stationary shaft and said stator core in said axial direction and having a stepped collar extending in a radial direction from said cylindrical boss.

10. An electric motor for driving a magnetic disk in accordance with claim 8, wherein said cylindrical boss provided between said stationary shaft and said stator core is made of a material having one of a high electric conductivity and a high permeability.

11. An electric motor for driving a magnetic disk in accordance with claim 10, wherein said cylindrical boss provided between said stationary shaft and said stator core is made of one of aluminum and an aluminum alloy.

12. An electric motor for driving a magnetic disk in accordance with claim 8, further comprising:

a preloading spring for imposing an axial preload on said bearing; and said stepped collar having a flat flange for retaining said preloading spring;

said cylindrical boss being formed of a same material as a material of said stepped collar; and said cylindrical boss and said stepped collar being integrally secured to said stationary shaft.

13. An electric motor for driving a magnetic disk in accordance with claim 8, wherein said cylindrical boss is formed of a same material as a material of said bracket; and said cylindrical boss being configured integrally with said bracket.

14. A motor for driving a magnetic disk in accordance with claim 8, wherein a material of said cylindrical boss is one of aluminum and an aluminum alloy.

15. A motor for driving a magnetic disk in accordance with claim 12 or 13, wherein a lower end of said stepped collar is arranged to contact said bracket, to accurately determine a height of said stepped collar.

16. A motor for driving a magnetic disk in accordance with claim 12 or 13, wherein said material is one of aluminum and an aluminum alloy.

* * * * *